US008127252B2

(12) United States Patent
McKeon et al.

(10) Patent No.: US 8,127,252 B2
(45) Date of Patent: Feb. 28, 2012

(54) METHOD AND SYSTEM FOR PRESENTING USER INTERFACE (UI) INFORMATION

(75) Inventors: Brendan McKeon, Seattle, WA (US); Michael Edward Dulac Winser, Westport, CT (US); Patricia Mary Wagoner, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1570 days.

(21) Appl. No.: 10/868,248

(22) Filed: Jun. 15, 2004

(65) Prior Publication Data
US 2005/0102636 A1    May 12, 2005

Related U.S. Application Data

(63) Continuation-in-part of application No. 10/703,889, filed on Nov. 7, 2003.

(51) Int. Cl.
*G06F 3/048* (2006.01)
(52) U.S. Cl. ........................................ 715/854; 715/853
(58) Field of Classification Search .................. 715/854, 715/853
See application file for complete search history.

(56) References Cited

U.S. PATENT DOCUMENTS

| | | | |
|---|---|---|---|
| 5,327,529 A * | 7/1994 | Fults et al. ..................... | 715/762 |
| 5,537,548 A | 7/1996 | Fin | |
| 5,600,778 A | 2/1997 | Swanson et al. | |
| 5,613,122 A | 3/1997 | Burnard et al. | |
| 5,627,958 A | 5/1997 | Potts | |
| 5,634,002 A | 5/1997 | Polk et al. | |
| 5,642,511 A * | 6/1997 | Chow et al. ..................... | 717/105 |
| 5,893,116 A | 4/1999 | Simmonds et al. | |
| 5,898,434 A * | 4/1999 | Small et al. .................... | 715/810 |
| 5,905,492 A | 5/1999 | Straub et al. | |
| 5,923,328 A * | 7/1999 | Griesmer ....................... | 715/854 |
| 5,933,824 A | 8/1999 | DeKoning et al. | |
| 5,953,724 A * | 9/1999 | Lowry .......................... | 707/102 |
| 6,029,170 A * | 2/2000 | Garger et al. .................. | 707/100 |
| 6,055,515 A | 4/2000 | Consentino et al. | |
| 6,104,391 A | 8/2000 | Johnston et al. | |

(Continued)

FOREIGN PATENT DOCUMENTS

EP    1156427 A2    11/2001

(Continued)

OTHER PUBLICATIONS

Dmitri Klementiev Software Driving Software: Active Accessibility-Complaint Apps Give Programmers New Tools to Manipulate Software MSDN Magazine Apr. 2000.*

(Continued)

*Primary Examiner* — Adam M Queler
*Assistant Examiner* — Andrea Long
(74) *Attorney, Agent, or Firm* — Shook, Hardy & Bacon L.L.P.

(57) ABSTRACT

A method, apparatus, and medium are provided for providing a custom view of a set of user-interface elements (UI elements) to a requesting component. The method includes representing the UI elements as a raw tree structure composed of a set of nodes, which correspond to the UI elements; identifying a subset of the nodes that satisfy the condition(s); and communicating to the requesting component a representation of all or some of the identified nodes. The apparatus includes a request-transmission component for submitting to an interface component instructions and a transmission-reception component for receiving from the interface component the information associated with one or more UI elements that satisfy the one or more conditions.

25 Claims, 24 Drawing Sheets

U.S. PATENT DOCUMENTS

| | | | |
|---|---|---|---|
| 6,144,377 A | 11/2000 | Oppermann et al. | |
| 6,161,126 A * | 12/2000 | Wies et al. | 709/203 |
| 6,188,399 B1 | 2/2001 | Voas | |
| 6,262,435 B1 | 7/2001 | Plat et al. | |
| 6,263,260 B1 | 7/2001 | Bodmer et al. | |
| 6,263,360 B1 | 7/2001 | Arnold et al. | |
| 6,334,157 B1 | 12/2001 | Oppermann et al. | |
| 6,341,280 B1 * | 1/2002 | Glass et al. | 707/3 |
| 6,348,935 B1 | 2/2002 | Malacinski et al. | |
| 6,363,435 B1 | 3/2002 | Fernando et al. | |
| 6,532,023 B1 | 3/2003 | Schumacher et al. | |
| 6,559,871 B1 | 5/2003 | Brozowski et al. | |
| 6,622,298 B1 | 9/2003 | Stamm | |
| 6,662,312 B1 | 12/2003 | Keller et al. | |
| 6,664,981 B2 | 12/2003 | Ashe et al. | |
| 6,690,356 B2 | 2/2004 | Johnston, Jr. | |
| 6,701,514 B1 | 3/2004 | Haswell et al. | |
| 6,710,782 B2 | 3/2004 | Ruff et al. | |
| 6,731,310 B2 | 5/2004 | Craycroft et al. | |
| 6,948,152 B2 | 9/2005 | Dubovsky | |
| 6,961,873 B2 | 11/2005 | Dubovsky | |
| 6,996,800 B2 | 2/2006 | Lucassen | |
| 7,010,793 B1 | 3/2006 | Chatterjee et al. | |
| 7,020,847 B1 * | 3/2006 | Holzheuer | 715/855 |
| 7,058,890 B2 * | 6/2006 | George et al. | 715/728 |
| 7,197,546 B1 | 3/2007 | Bagga et al. | |
| 7,337,405 B2 | 2/2008 | Weng et al. | |
| 7,356,472 B2 | 4/2008 | Cross et al. | |
| 7,421,645 B2 | 9/2008 | Reynar | |
| 7,448,041 B2 | 11/2008 | Creamer et al. | |
| 2001/0028359 A1 | 10/2001 | Muraishi et al. | |
| 2003/0046316 A1 | 3/2003 | Gergic et al. | |
| 2003/0063120 A1 * | 4/2003 | Wong et al. | 345/746 |
| 2003/0067485 A1 | 4/2003 | Wong et al. | |
| 2003/0151633 A1 * | 8/2003 | George et al. | 345/864 |
| 2003/0184588 A1 | 10/2003 | Lee | |
| 2004/0003091 A1 | 1/2004 | Coulthard et al. | |
| 2004/0003119 A1 | 1/2004 | Munir et al. | |
| 2004/0003348 A1 | 1/2004 | Ostertag et al. | |
| 2004/0003349 A1 * | 1/2004 | Ostertag et al. | 715/514 |
| 2004/0003371 A1 | 1/2004 | Coulthard et al. | |
| 2004/0064593 A1 * | 4/2004 | Sinclair et al. | 709/250 |
| 2004/0123239 A1 * | 6/2004 | Roessler | 715/513 |
| 2005/0050011 A1 * | 3/2005 | Van Der Linden et al. | 707/3 |
| 2005/0086608 A1 * | 4/2005 | Roessler | 715/764 |

FOREIGN PATENT DOCUMENTS

| | | |
|---|---|---|
| RU | 22281 U1 | 3/2002 |
| RU | 2192049 C1 | 10/2002 |
| WO | 9716796 A1 | 5/1997 |
| WO | 9744729 | 11/1997 |
| WO | 0243353 A2 | 5/2002 |
| WO | 03069500 A1 | 8/2003 |

OTHER PUBLICATIONS

Saul Greenburg and Michael Boyle Customizable Physical Interfaces for Interacting with Conventional Applications UIST'02, Oct. 27-30, 2002 vol. 4, Issue 2 pp. 31-40.*

NonFinal Office Action, Date Mailed: May 22, 2006, U.S. Appl. No. 10/366,941.

Final Office Action, Date Mailed: Oct. 3, 2006, U.S. Appl. No. 10/366,941.

Advisory Action, Date Mailed: Dec. 11, 2006, U.S. Appl. No. 10/366,941.

NonFinal Rejection, Mail Date: Mar. 9, 2007, U.S. Appl. No. 10/366,941.

Final Rejection, Mail Date: Aug. 21, 2007, U.S. Appl. No. 10/366,941.

Non-Final Office Action dated May 19, 2006, U.S. Appl. No. 10/367,226.

Final Rejection Mail Date Oct. 27, 2006 U.S. Appl. No. 10/367,226.

Non-Final Rejection, Mail Date: May 10, 2007, U.S. Appl. No. 10/367,226.

Final Rejection, Mail Date Sep. 25, 2007, U.S. Appl. No. 10/367,226.

Non-Final Rejection Mail Date Jan. 28, 2008, U.S. Appl. No. 10/367,226.

Notice of Allowance and Fees Due dated Jul. 25, 2008, U.S. Appl. No. 10/367,226.

Non-Final Rejection, Mail Date Feb. 1, 2007, U.S. Appl. No. 10/703,899.

Non-Final Rejection, Mail Date May 15, 2006, U.S. Appl. No. 10/367,530.

Final Rejection, Mail Date Oct. 6, 2006, U.S. Appl. No. 10/367,530.

Non-Final Rejection, Mail Date Apr. 10, 2007, U.S. Appl. No. 10/367,530.

Non-Final Rejection, Mail Date Feb. 4, 2008, U.S. Appl. No. 10/367,530.

Final Rejection, Mail Date Aug. 18, 2008, U.S. Appl. No. 10/367,530.

Non-Final Rejection, Mail Date Mar. 17, 2009, U.S. Appl. No. 10/367,530.

Final Rejection, Mail Date Oct. 5, 2009, U.S. Appl. No. 10/367,530.

Non-Final Rejection, Mail Date Nov. 20, 2006, U.S. Appl. No. 10/439,514.

Final Rejection, Mail Date May 21, 2007, U.S. Appl. No. 10/439,514.

Non-Final Rejection, Mail Date Nov. 15, 2007, U.S. Appl. No. 10/439,514.

Final Rejection, Mail Date Jun. 10, 2008, U.S. Appl. No. 10/439,514.

Non-Final Rejection, Mail Date Jun. 14, 2007, U.S. Appl. No. 10/916,715.

Final Rejection, Mail Date Nov. 15, 2007, U.S. Appl. No. 10/916,716.

John Zukowski, Java AWT Reference, Chapter 4, Mar. 1997, pp. 94-158.

Memon et al., "Hierarchical GUI Test Case Generation Using Automated Planning," IEEE Transactions on Software Engineering, vol. 27, No. 2, Feb. 2001, pp. 144-155.

European Search Report EP26992-034/df, Appl. No. 03006507.2-2211 PCT, Microsoft Corporation.

David Platt, The COM+ Event Service Eases the Pain of Publishing and Subscribing to Data, Sep. 1999, 18 pages.

Calum Benson et al., GNOME Accessibility for Developers (CVS draft), Internet document, Oct. 16, 2002, retrieved from the internet at: URL: http://web.archive.org/web/20030201192710/http://developer.gnome.org/projects/gap/guide/gad/index.html>; pp. 3-6.

Andreas Zeller et al., DDD—A Free Graphical Front-End for UNIX Debuggers, ACM SIGPLAN Notices, Association for Computing Machinery, New York, Jan. 1996, pp. 22-27, vol. 31, No. 1.

"Reflections," an Internet document, URL: http://www.Freshsources.com/Aug01.pds<m /ayg, 2991m 13 pp.

Chuck Allison, Articles,from the C/C++ Users Journal (Arranged by Programming Language), an Internet document, URL: http://www.freshsources.com/>m Jan. 26, 2005, 3 pp.

Vogtle et al., "A Critical Interface: Occupational Therapy, Engineering and Assistive Technology," IEEE, Proceedings of the 22nd Annual EMBS International Conference, Jul. 23-28, 2000, Chicago, Illinois, pp. 2379-2382.

Greenberg et al., "Customizable Physical Interfaces for Interacting With Conventional Applications," UIST 2002, Oct. 27-30, 2002, Paris, France, vol. 4, Issue 2, pp. 31-40.

Dmitri Klementiev, "Software Driving Software: Active Accessibility-Compliant Apps Give Programmers New Tools to Manipulate Software," Apr. 29, 2004, pp. 1-15, http://msdn.microsoft.com/msdnmag/issues/0400/aascess/default.aspx.

John L. Viescas, Running Microsoft Access for Windows® 95, 1996, Microsoft Press, pp. 5, 98, 218, 374, 386.

Herbert Schildt, The Complete Reference Java® 2, 2002, McGraw Hill/Osborne, 5th Edition, pp. 19, 20, 588, 886, 894.

* cited by examiner

METHOD AND SYSTEM FOR PRESENTING USER INTERFACE (UI) INFORMATION

CROSS-REFERENCE TO RELATED APPLICATIONS

This application is a Continuation-In-Part (CIP) of an earlier filed, pending, application, having application Ser. No. 10/703,889 and filed on Nov. 7, 2003, the content of which, including drawings, is expressly incorporated by reference herein.

STATEMENT REGARDING FEDERALLY SPONSORED RESEARCH OR DEVELOPMENT

Not applicable.

TECHNICAL FIELD

This invention relates to the field of interpreting elements of a user interface in a computing environment and providing information regarding the same.

BACKGROUND OF THE INVENTION

Individuals interact with computers through a user interface. The user interface enables a user to provide input to and receive output from the computer. The output provided can take on many forms and often includes presenting a variety of user-interface elements, sometimes referred to as "controls." Exemplary user-interface elements include toolbars, windows, buttons, scrollbars, icons, selectable options, graphics that compose controls (such as images, text, etc.) and the like. Virtually anything that can be clicked on or given the focus falls within the scope of "element" as used herein. Information related to user-interface elements is often requested by assistive-technology products so that the products can enhance a user's computing experience.

Assistive-technology products are specially designed computer programs designed to accommodate an individual's disability or disabilities. These products are developed to work with a computer's operating system and other software. Some people with disabilities desire assistive-technology products to use computers more effectively.

Individuals with visual or hearing impairments may desire accessibility features that can enhance a user interface. For example, individuals with hearing impairments may use voice-recognition products that are adapted to convert speech to sign language. Screen-review utilities make on-screen information available as synthesized speech and pairs the speech with visual representations of words in a format that assists persons with language impairments. For example, words can be highlighted as electronically read. Screen-review utilities convert text that appears on screen into a computer voice.

To provide supportive features to persons that desire to use them, assistive-technology applications do not have access to the same code that native applications are able to use. This is because an assistive-technology application works on behalf of a user; instead of the user working directly with the user interface—as is the case in native applications. For instance, if a word-processing application wishes to display text to user, it can easily do so because the word-processing application knows what program modules to call to display the text as desired. But a screen reader—an application that finds text and audibly recites the text to a user—is unaware of much of a target application's programmatic code. The screen reader must independently gather the data needed to identify text, receive it, and translate it into audio.

Assistive-technology applications work under a variety of constraints. To further illustrate a portion of the constraints that assistive-technology applications are subject to, consider, for example, an application that needs to display the contents of a listbox. This would be an easy task for a native application because it would know where the relevant list-box values are stored and simply retrieve them for display. But an assistive-technology application does not know where the values are stored. It must seek the values itself and be provided with the necessary information to display the values. Thus, assistive-technology applications must function with limited knowledge of an application's user interface.

The difficulties associated with an assistive-technology application performing certain functions on all types of user-interface elements is somewhat akin to the difficulties that would be faced by a person asked to be able to program any type of VCR clock simply by providing access to the VCR clock. Unlike the VCR owner who is familiar with his VCR's clock and has the VCR manual, the fictitious person here has no foreknowledge of what type of VCR he may come across, what type of actions are necessary to program the clock, whether it will be a brand ever seen before, or the means of accessing its settings—which may be different from every other VCR previously encountered. Moreover, expecting the person to know about every type of VCR is an unrealistic proposition. As applicable to the relevant art, it is an unrealistic proposition to expect every requesting component to know about every type of listbox that it might encounter. Programming such a requesting component would be an expensive and resource intensive process.

One way a user interface may provide this information is by using logical hierarchal structures. A significant problem in the art, however, is that logical hierarchal structures provided by a user interface often do not have the requisite level of granularity needed by an assistive-technology application. Without the benefit of an adequate description of a UI or knowing the contents of certain data elements (such as list-boxes, combo boxes, and many others), assistive-technology applications must request this information from the user interface to be able to manipulate or otherwise make use of the data.

Although requesting components such as assistive-technology applications can provide various user-interface customizations if they can receive accurate data regarding the user-interface elements, providing accurate information regarding user-interface elements has proven difficult. This difficulty stems from the fact that no single entity knows all the relevant information about any particular piece of a user interface. For example, although a list-box component may itself know the individual list-box items contained within it, only the name of the listbox may be known by its parent dialog window. Although a user interface or portion of a user interface may be depicted as a hierarchal structure such as a tree, a single tree may only provide limited information, which can prevent an assistive-technology application from functioning properly.

A user interface is typically composed of elements from various different platforms in various different processes, complicating interaction with the UI. A platform is a suite of APIs, libraries, and/or components that comprise building blocks of an operating system. A first exemplary platform is the "WIN32" platform, which uses HWNDs as a basic element type. A second illustrative platform is HTML, which uses HTML elements to compose a platform. Other illustrative platforms include those used to develop a Linux or Macintosh® user interface. These platforms often have incompatible APIs. For example, HTML uses a first platform to build its user interface, but controls in a WIN32 environment use another platform to build their UI. These disparate UI platforms live as a collection of disjointed trees, a scheme which is difficult for client applications (or requesting applications) to interact with. The UI of an application can be illustrated as a set of UI elements that are arranged in a hierarchy that typically indicates containment (although HTML allows child elements to be positioned on the screen outside of the bounds of parent elements). For example, a desktop may contain multiple application windows, one of which may contain a title bar, scrollbars, controls, which may include a list control, which may in turn contain list items, which may still further contain text and images. We note that the term "desktop" is commonly associated with an aspect of the Windows® operating system produced by Microsoft Corporation of Redmond, Wash., but we do not mean to associate such a narrow definition to the term as used herein. Rather, "desktop" is a term that we will often refer to as representing the highest level of a hierarchal tree. Other operating systems, such as Linux; the Mac OS™ offered by Apple Computer, Inc. of Cupertino; Calif.; the Solaris™ Operating System offered by Sun Microsystems, Inc. of Santa Clara, Calif.; and other operating systems have work spaces that represent the top-most level of a user interface. It is that upper-most level of interest, which may not necessarily be the top level, that we intend to describe as the term "desktop" is used throughout this disclosure.

As previously mentioned, the system that manages a particular set of elements is referred to as a platform. Exemplary functions performed by platforms include allocating and subdividing screen real estate (for example, deciding where a list box should be placed and ensuring that its drawing does not interfere with other elements); routing input (such as mouse clicks and keyboard presses) to correct elements; and managing basic UI-related state for an element (such as focus, enabled, location, and the like).

Also, any control that manages screen real estate and/or input can be regarded as a platform. For example, a list box is limited in functionality, but it does manage the location of its list items, and it also manages input on their behalf. Accordingly, such an item falls within the meaning of "platform" as used herein.

Because the different platforms all use different interfaces to obtain information about their underlying elements, they are generally incompatible. That is, code written to retrieve information associated with a child of a node in a first application would be different than code that retrieves a similar topological node in a different platform. Developers often use different platforms for different reasons. Some platforms are better suited to carry out various functions than are other platforms. When multiple platforms are used within an application, it is often the case that the platforms are not explicitly aware of how they are connected. For example, a list box (a WIN32 element) within a table in a Web page (HTML elements) has no knowledge that it is within the table.

Still further compounding the problem associated with a requesting component interacting with various UI elements is the fact that platforms typically store information within the process that is displaying the UI. For example, in a calculator application, the element tree structure may be contained entirely within the calculator process. As will be explained in greater detail below, crossing process boundaries can negatively impact system performance. As previously mentioned, tools, applications, and other requesting components that wish to access a UI to obtain information about it or to interact with it has historically had to deal with at least the following exemplary problems: maintaining awareness of multiple incompatible platforms, crossing process boundaries to retrieve information about different user interfaces, and being aware of transitions from one platform to another to hopefully enable navigation between user interfaces that are composed of multiple disjoint subtrees. A developer faced with addressing such problems faced a formidable task to develop a requesting component that could richly interact with UI elements of various user interfaces.

Another significant shortcoming of the prior art is the lack of flexibility that a client application or other requesting component has with respect to viewing a tree that represents elements of a user interface. A tree that represents all elements of a user interface may be referred to as a raw tree. This raw tree, according to the present invention described below, can include levels of granularity never before possible. But a requesting client may not need such level of granularity. For instance, a client may only be interested in receiving information associated with UI elements that can receive user input. Or perhaps a requesting component desires to navigate to some next node that satisfies a condition, such as having a specific name. The prior art does not allow for the submission of any such condition to a platform. Absent the present invention, a requesting client application is at the mercy of receiving uncustomized views of representations of user-interface elements.

There is a need in the prior art to free such requesting components from having to deal with the aforementioned issues and thereby enable them to carry out their domain-specific work. That is, the current state of the prior art could be improved by presenting to requesting components a uniform view of a user interface that includes a single unified tree of elements that allows clients to access the structure of a desired user interface, such that elements in such a structure can then provide access to information about the UI corresponding to a node of interest (properties), access to functionality of the user interface (patterns), and/or access to notifications concerning changes in that user interface (events). Moreover, the present state of the art could be improved by providing a set of predefined views of a raw tree. For example, filtering a raw tree according to a set of conditions provided by a requesting component.

A shortcoming exists in the current state of the art whereby providing information described by two or more logical trees is either impossible or inordinately difficult. For example, a user interface may have three windows with a button and a listbox in one of the three windows. Information about the user interface (the three windows for example) may be contained in a first tree while information about the contents of the listbox may be described by a second tree. In such a situation, an assistive-technology application that requires knowledge of both trees must try to derive this information itself, which is difficult. There is no efficient way to represent the two or more trees to the requesting component as a single hierarchal representation. Accordingly, there is a need for a method and system for providing accurate, comprehensive hierarchal-structure information about user-interface components described in two or more logical trees to a requesting application. Moreover, there is a need to provide the information in a format that is easy for the requesting application to process.

SUMMARY OF THE INVENTION

The present invention solves addresses the above problems by providing a system and method that represents two or more logical hierarchal structures as a single hierarchal structure. Custom views of the single hierarchal structure can be presented to a requesting component subject to conditions provided by it. The present invention has several practical applications in the technical arts not limited to providing more comprehensive user-interface information to requesting applications, simplifying the development of components that interact with a user interface (UI), simplifying navigation of structure representing UI elements, and providing the ability to define or specify custom views of a raw tree.

In a first aspect of the present invention, a method is described for providing a custom view of a set of UI elements. UI elements can be represented as a raw tree structure that has a set of nodes, which correspond to the UI elements. A subset of the nodes are identified that satisfy one or more conditions. Finally, a representation of all or some of the identified nodes are communicated to a requesting component that desires such information.

In a second illustrative aspect, the present invention includes an application interface (API) for processing calls from a requesting component to navigate a tree structure composed of nodes that represent a plurality of (UI elements). The API includes a set of computer-readable program components that provide for receiving a request to navigate to a target UI element. The request includes at least one condition to be met. The API also provides for the application of the at least one condition to all or a portion of the nodes, whereby the target UI element is identified based on the condition. Finally, the requesting component returns attribute information associated with the identified UI element.

In a third illustrative aspect, the present invention includes a method for representing to a requesting component a portion of UI elements of a target component. The UI-elements have one or more attributes. The method includes receiving from the requesting component at least one condition that indicates UI-element attributes of interest, providing a logical tree that is composed of a set of nodes that represent a corresponding plurality of UI elements, identifying one or more UI elements that satisfy the at least one condition, and conveying information associated with the identified one or more UI elements to the requesting component.

In a final illustrative aspect, a computer program product is provided to retrieve information related to UI elements. The computer-program product includes a request-transmission component for submitting to an interface component instructions that include a request for information related to UI elements that satisfy the one or more conditions and one or more conditions that indicate attributes of interest that may be possessed by UI elements of the user interface. Also included is a transmission-reception component for receiving from the interface component the information associated with one or more UI elements that satisfy the one or more conditions.

BRIEF DESCRIPTION OF THE SEVERAL VIEWS OF THE DRAWINGS

The present invention is described in detail below with reference to the attached drawing figures, which are incorporated by reference herein, and wherein.

DETAILED DESCRIPTION OF THE INVENTION

The present invention provides a novel method and apparatus for representing a user interface and/or elements of a user interface to a requesting component. Conditions can be provided by a requesting component to customize a view of a raw tree. Increased granularity is provided so that the elements can be manipulated or otherwise used by a requesting component. The present invention will be better understood from the detailed description provided below and from the accompanying drawings of various embodiments of the invention. The detailed description and drawings, however, should not be read to limit the invention to the specific embodiments. Rather, these specifics are provided for explanatory purposes that help the invention to be better understood.

Specific hardware devices, programming languages, components, processes, and numerous details including operating environments and the like are set forth to provide a thorough understanding of the present invention. In other instances, structures, devices, and processes are shown in block diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or network of networks.

Raw-Tree Generator

Figure 1:
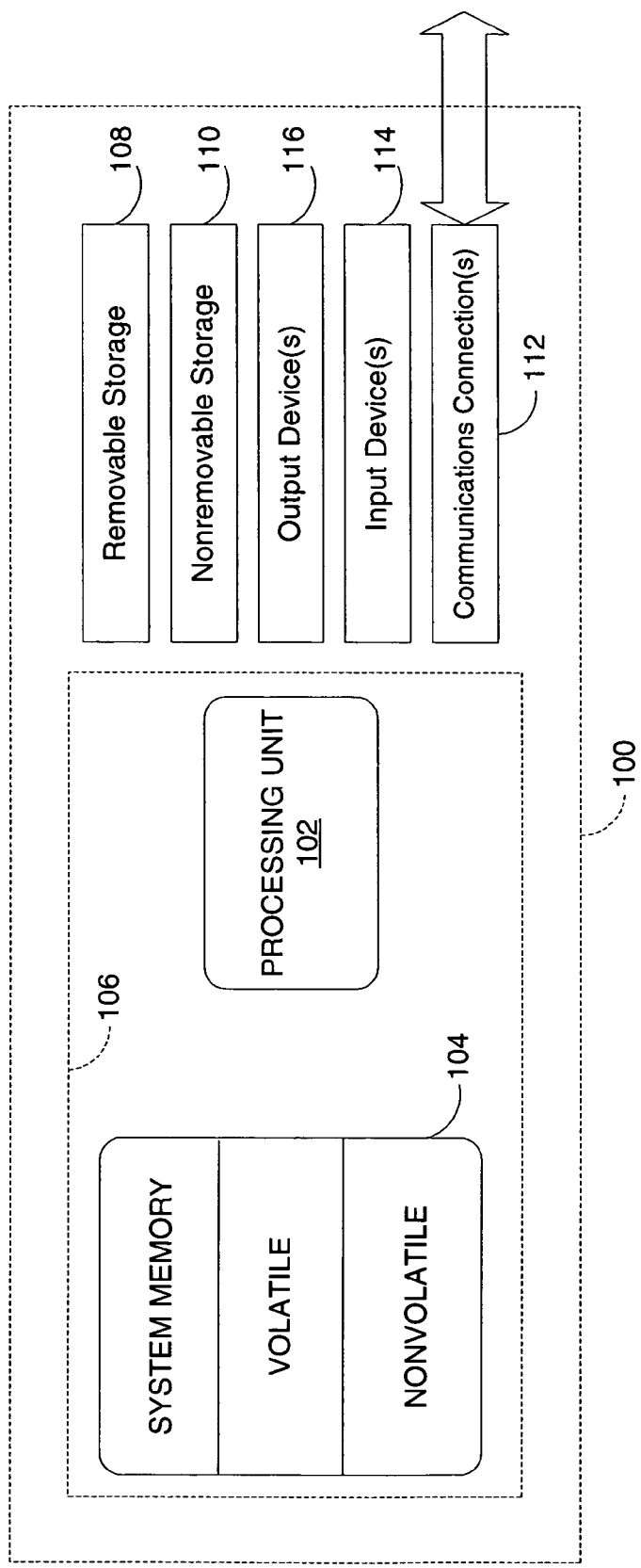
FIG. 1 depicts a first exemplary computing environment suitable for practicing an embodiment of the present invention.

With reference to FIG. 1, an exemplary system for implementing the invention includes a computing device, such as computing device 100. Computing device 100 may take the form of a conventional computer, handheld computer, notebook computer, server, workstation, PDA, or other device capable of processing instructions embodied on one or more computer-readable media. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This basic configuration is illustrated in FIG. 1 by dashed line 106.

Device 100 may also have additional features that offer a variety of functional aspects. For example, device 100 may include additional storage (removable and/or non-removable) including, but not limited to, magnetic, optical, or solid-state storage devices. Exemplary magnetic storage devices include hard drives, tape, diskettes, and the like. Exemplary optical-storage devices include writeable CD-ROM, DVD-ROM, or other holographic drives. Exemplary solid-state devices include compact-flash drives, thumbdrives, memory-stick readers and the like. Such additional storage is illustrated in FIG. 1 by removable-storage component 108 and nonremovable storage 110.

Computer storage media include volatile and nonvolatile, removable and non-removable media implemented in any method or technology for storage of information such as computer-readable instructions, data structures, program modules, and the like. Memory 104, removable storage 108 and nonremovable storage 110 are all examples of storage media. Storage media include, but are not limited to, RAM, ROM, EEPROM, flash memory, CD-ROMs, Digital Versatile Discs (DVD), holographic discs, or other optical storage, magnetic cassettes, magnetic tape, magnetic disk storage or other magnetic storage devices, solid-state media such as memory sticks and thumbdrives, or any other medium that can be used to store information and that can accessed by device 100. Any such computer-storage media may be part of device 100.

Device 100 may also contain communications connection(s) 112 that allow the device to communicate with other devices. Communications connection(s) 112 are an example of communication media. Communication media typically embody computer-readable instructions, data structures, program modules, or other data in a modulated data signal such as a carrier wave or other transport mechanism and includes any information-delivery media. The term "modulated data signal" includes a signal that has one or more of its characteristics set or changed in such a manner as to encode information in the signal. By way of example, and not limitation, communication media include wired media such as a wired network or direct-wired connection, and wireless media such as acoustic, RF, infrared, spread spectrum, the many flavors of 802.1 technologies (802.1a, 802.1b, 802.1g), and other wireless media. The term "computer-readable media" as used herein includes both storage media and communications media.

Device 100 may also have input device(s) 114 such as a keyboard, mouse, pen, voice-input device, touch-input device, etc. Output device(s) 116 such as a display, speakers, printer, etc. may also be used in connection with device 100 or incorporated within it. All these devices are well know in the art, need not be discussed at length here, and are not discussed at length so as to not obscure the present invention.

As one skilled in the art will appreciate, the present invention may be embodied as, among other things: a method, system, or computer-program product. Accordingly, the present invention may take the form of a hardware embodiment, a software embodiment, or an embodiment combining software and hardware. In a preferred embodiment, the present invention takes the form of a computer-program product that includes computer-useable instructions embodied on one or more computer-readable media.

Figure 2:
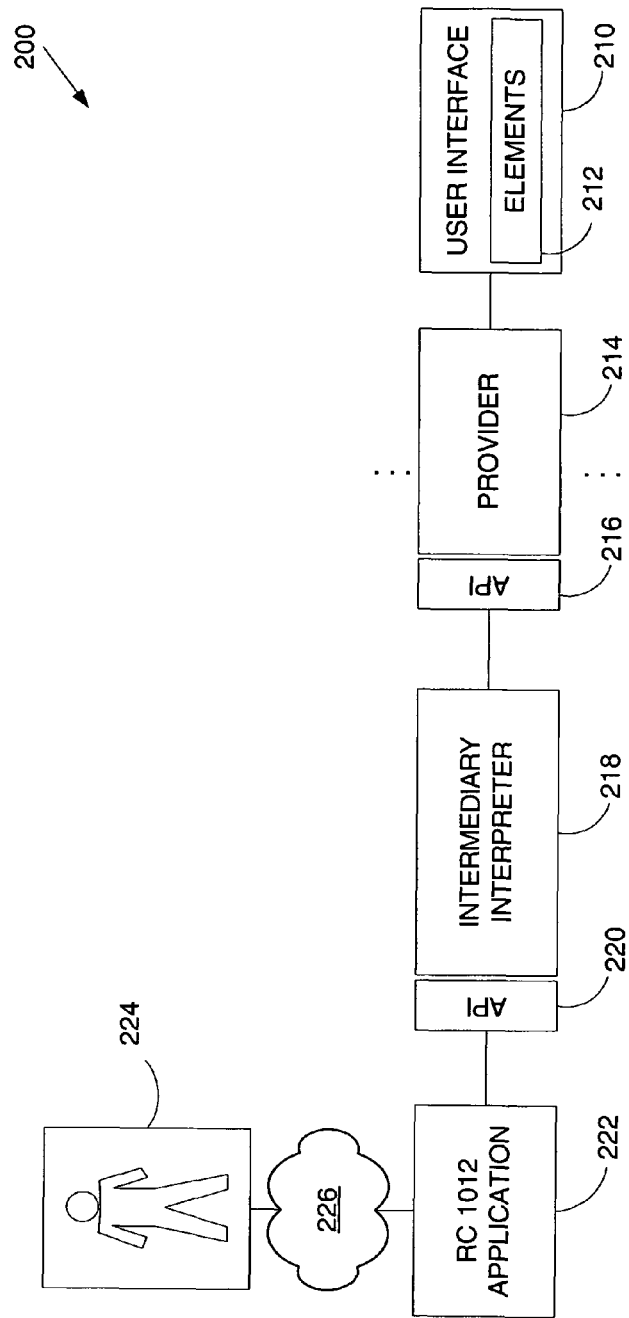
FIG. 2 is block diagram depicting an exemplary data-flow model according to an embodiment of the present invention.

Turning now to FIG. 2, a dataflow diagram in accordance with an embodiment of the present invention is referenced generally by the numeral 200. FIG. 2 includes a user interface 210 that has one or more elements 212. Exemplary items that fall within the scope of elements 212 include any user-interface object that can be clicked on by a pointing device, typed in, given the focus, or activated in a user interface environment. Exemplary elements 212 include a window, a button, a toolbar, a scrollbar, a hyperlink, a text item, an icon, and the like. An element may also include a component that provides auditory or physical feedback, such as an audio-feedback message or a peripheral device that provides physical feedback such as a vibrating mouse.

User interface 210 is coupled to a provider 214, which has associated with it a provider-side API 216. The provider side API 216 is coupled to an intermediary interpreter 218, which has associated with it a client-side API 220 and one or more consolidators (explained in greater detail below). The client-side API 220 is coupled to a client 222, which is finally interacted with by a user 224 though various intermediary components represented by cloud 226.

As used herein, a "provider," such as provider 214, is a software component that retrieves hierarchal-component information. The information needed to extract information from various types of controls is packaged within one or more providers. A logical tree is an exemplary way to store hierarchal structural information. Provider 214 may employ a variety of technologies to extract information from a specific element and pass that information on to intermediary interpreter 218. Different elements may have different providers associated with them. Thus, if information about a button is desired, a first provider may be used, whereas a different provider may be used to retrieve information about either a different type of button or a different type of element. In a preferred embodiment, providers work at a control level rather than at an application level. Provider 214 performs several functions not limited to registering itself with intermediary interpreter 218 including providing information related to an element's properties, providing information related to an element's patterns, raising events, and exposing structural elements such as relative links.

Although "properties" and "patterns" which will be explained in greater detail below, properties generally describe a user interface corresponding to a node and patterns generally describe functionality that enable interaction with a node. Different techniques may be employed to gather information from different components. In a first technique, internal APIs may be used to gather desired data. In other applications, a messaging service may be employed or the element's object model, or internal state, may be accessed directly. As reflected by the ellipses shown in FIG. 2, operating environment 200 may include any number of providers 214 and corresponding provider APIs 216.

Intermediary interpreter 218 receives information provided by one or more providers 214 and presents that data in such a way that requesting component 222 sees one seamless hierarchal structure. A "tree" refers to a logical data arrangement where the data arrangement assumes a hierarchal nature. The functionality provided by intermediary interpreter 218 will be explained in greater detail with reference to FIGS. 3 through 9.

Figure 3:
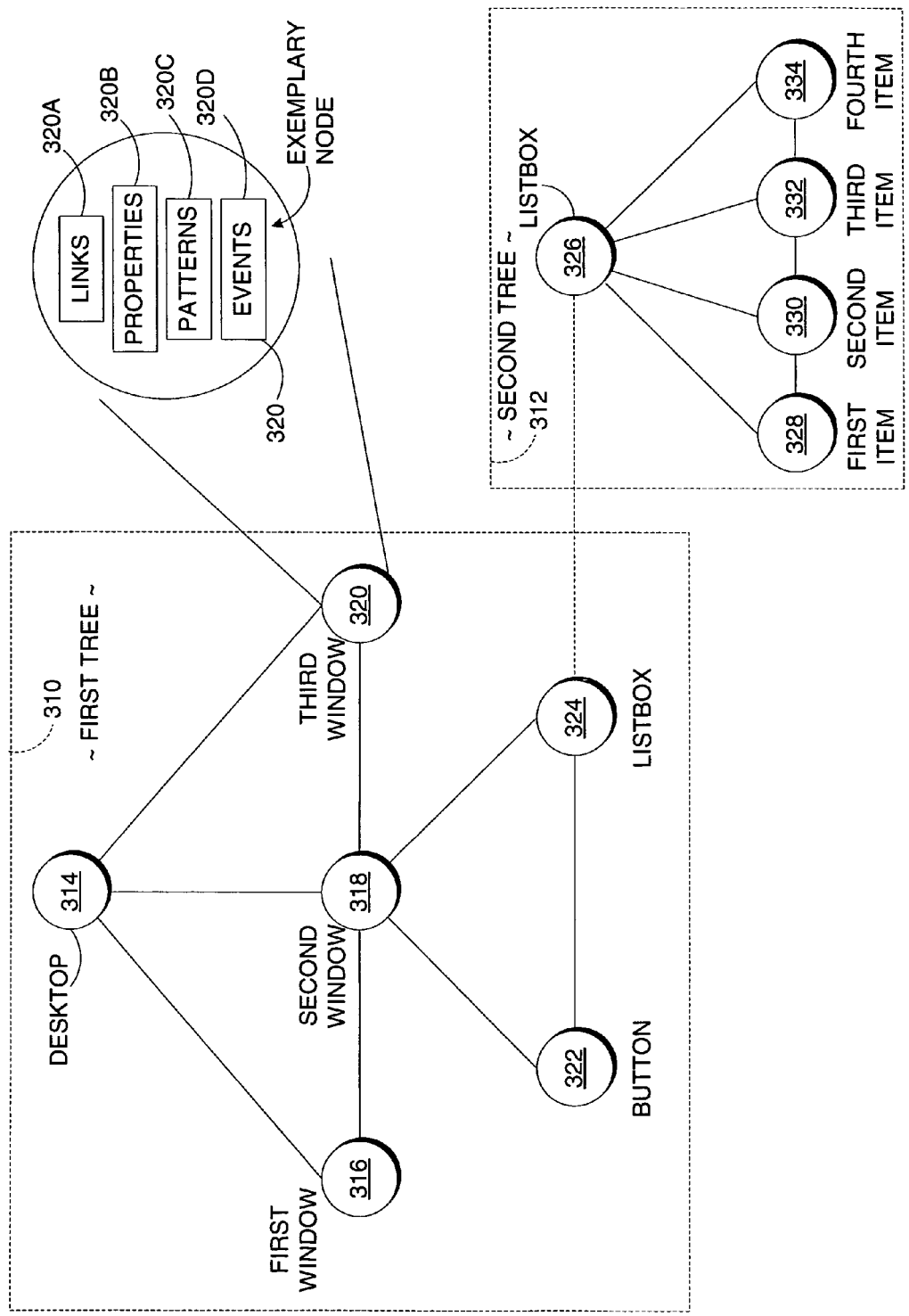
FIG. 3 depicts an illustrative node having links, properties, and patterns and illustrates a user-interface portion that requires two hierarchal structures to describe it.

Turning now to FIG. 3, a first tree 310 is depicted along with a second tree 312. As with all trees described and illustrated herein, trees 310 and 312 are illustrative in nature and should not be construed as a limitation of the present invention. In practical application, trees are often significantly more complicated and may have several tens or hundreds of nodes spanning several layers. The foregoing tree illustrations are provided in a simplified format so as to not obscure the present invention. Tree 310 provides an illustration of how a desktop that has certain elements may be represented as a logical tree.

As shown, the desktop includes three windows where the second window has a button and a listbox. Thus, the desktop itself is represented by node 314. The three windows that appear on the desktop are represented by child nodes 316, 318, and 320, which respectively correspond to a first window, a second window, and a third window. The second window, represented by node 318, includes a button and a listbox, which are represented by respective nodes 322 and 324.

Programming resources and operating efficiencies limit the amount of information contained in any single tree. Thus, a variety of logical trees are used to represent various levels of granularity in a user interface. FIG. 3 illustrates that the granularity of desktop tree 310 stops with a label of listbox 324. If a requesting application desired information relating to the desktop (e.g., the contents of listbox 324) then that request, in certain situations, may not be able to be fulfilled because desktop tree 310 does not include information relating to the elements within listbox 324. That level of granularity is provided in the listbox tree 312. Typically, separate APIs are used to access each tree.

As shown, listbox 312 includes a listbox that has four items. The listbox is represented by node 326 and each of its four corresponding list-box elements is represented by child nodes 328, 330, 332, and 334. The present invention provides a method for merging logical trees, and in this example, would provide to a requesting component a representation that would appear to be a single tree including granularity encompassing the desktop representation all the way down to the list-box elements.

With further reference to FIG. 3, node 320 is arbitrarily selected as an exemplary node used throughout the description of the present invention. Shown in blowup form, exemplary node 320 includes a set of relative links 320A, a set of properties 320B, and a set of patterns 320C. Relative links 320A refer to a description of the relative links associated with a specific node, which relative links will be described in greater detail with reference to FIG. 6. Properties 320B describe element attributes. Exemplary element attributes include an indication of an element's position, an element's name, a description of an element's type (e.g., whether the element is a button, a window, a listbox, a combo box, etc.), whether the element is read-only, whether the element can receive the focus, whether the element is enabled or disabled, and the like. Although other terms may be used in the art, properties 320B are intended to include the litany of other attributes in addition to the exemplary attributes provided.

Patterns 320C enable requesting component 222 to access the broad functionality associated with a control or user-interface element. As would be appreciated by one skilled in the art, patterns 320C can be interfaces where different patterns represent different types of functionality. In this way, interfaces are used in programming languages to access functionality of elements. For example, buttons and similar controls that can be pressed to issue commands support a pattern that allows a client to press the button or otherwise issue an associated command. Listboxes, comboboxes and other controls that manage selection of child items support a pattern that allows a requesting component to request changes to the selection. Controls that have multiple aspects of functionality can support multiple patterns simultaneously. Patterns 320C are an example of the attributes/information associated with a node, and should not be construed as limitation of the present invention. Where such information exists, however, the present invention provides for its merging, as will be described in greater detail below.

Figure 4:
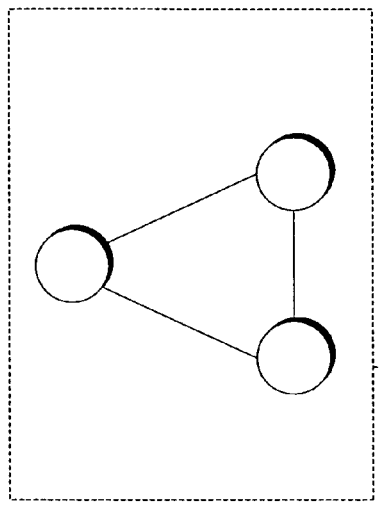
FIG. 4 visually depicts a problem to be solved by the present invention, namely how to merge two hierarchal structures.
Figure 4:
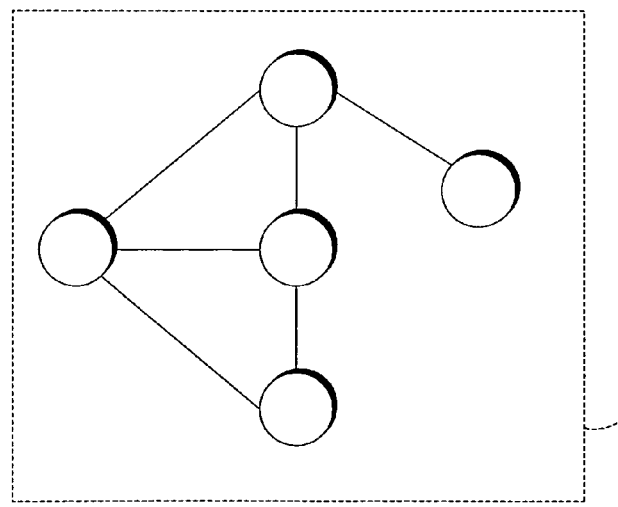

FIG. 4 visually depicts one of the problems to be solved by the present invention. That is, FIG. 4 illustrates that two hierarchal structures, trees 410 and 412, are to be logically merged.

Figure 5:
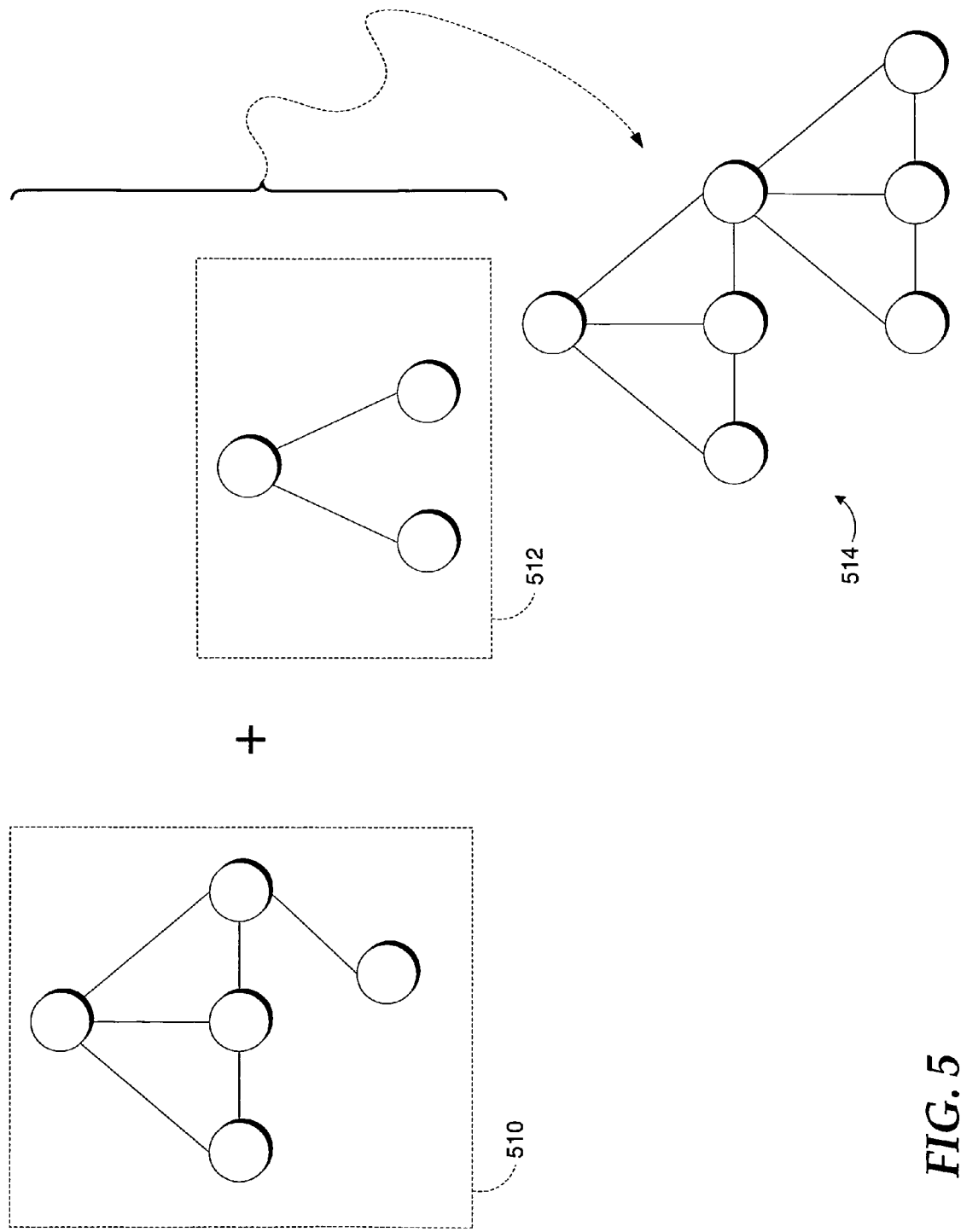
FIG. 5 is a block diagram depicting an object of the present invention, to represent two or more logical trees as a single tree.

FIG. 5 illustrates combining a first logical tree 510 with a second logical tree 512 to produce what appears to requesting component 222 as a single tree 514. Tree 514 is depicted as a representation of how requesting component 222 views the combination of trees 510 with 512 and is not intended to convey that tree 512 is actually grafted onto tree 510. Rather, as will be discussed in greater detail below, an object of the present invention is for requesting component 222 to be presented with a representation that appears to be a single logical tree, but which in fact is an aggregation of multiple trees that includes referential identifiers to create the appearance of a single tree. Moreover and in addition to aggregating the relative links is trees 510 and 512, the set of properties and patterns associated with the merged node will include the aggregated properties of the corresponding nodes from trees 510 and 512. But combining tree 512 with tree 510 is a nontrivial task. Each node of FIG. 5 can potentially refer to five different nodes as depicted in FIG. 6.

Figure 6:
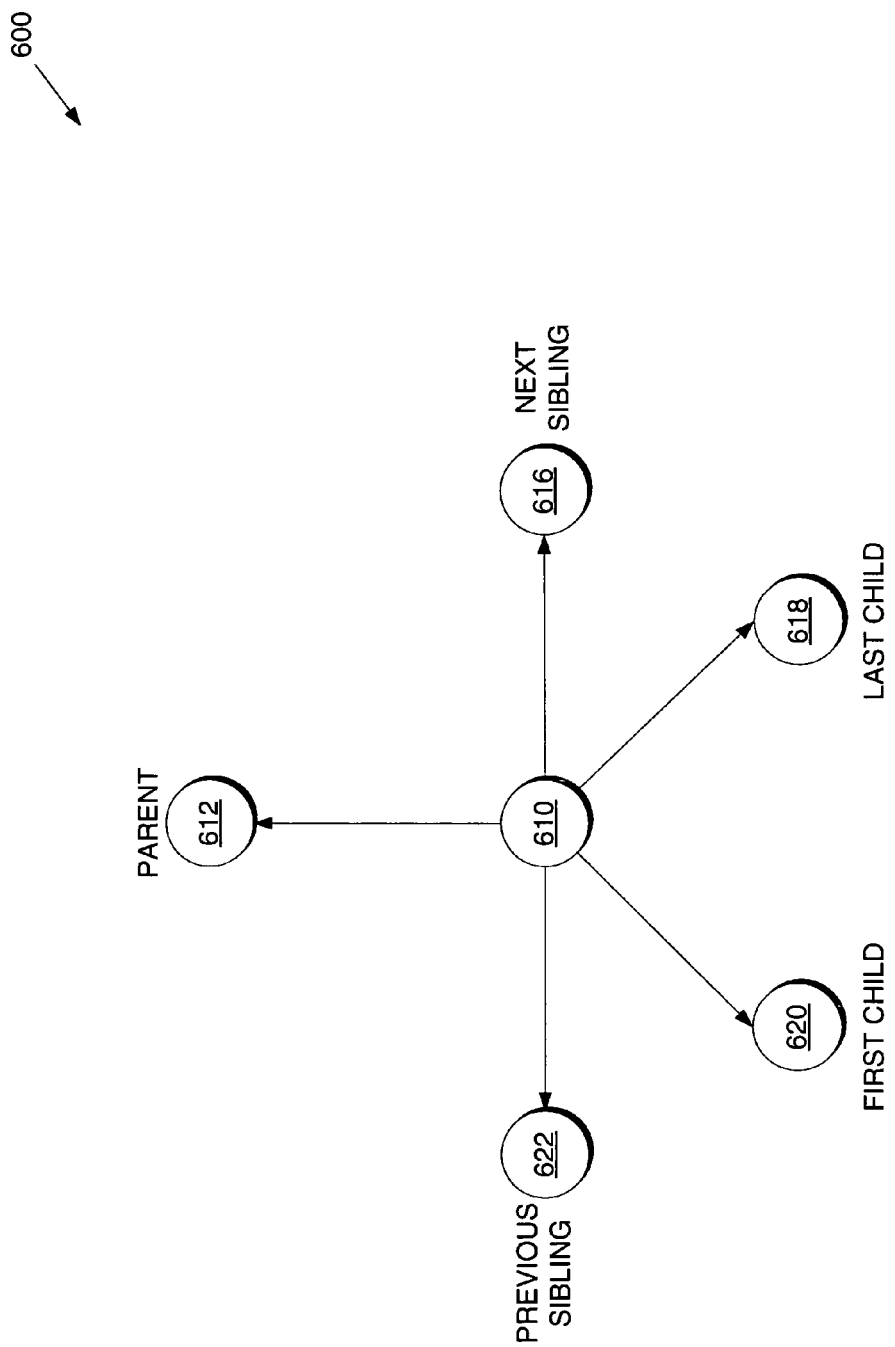
FIG. 6 is a block diagram depicting the various node relationships available to a node in accordance with an embodiment of the present invention.

FIG. 6 illustrates an exemplary set of hierarchal links associated with a node. A central node 610 may have at least one parent node 612, a next-sibling node 616, a last child node 618, a first-child node 620, and a previous-sibling node 622. FIG. 6 illustrates that a single node may refer to at least five different nodes. Although not shown, each of the five different nodes may also refer to other nodes. That is, FIG. 6 does not illustrate potential bidirectional relationships associated with each node.

Figure 7A:
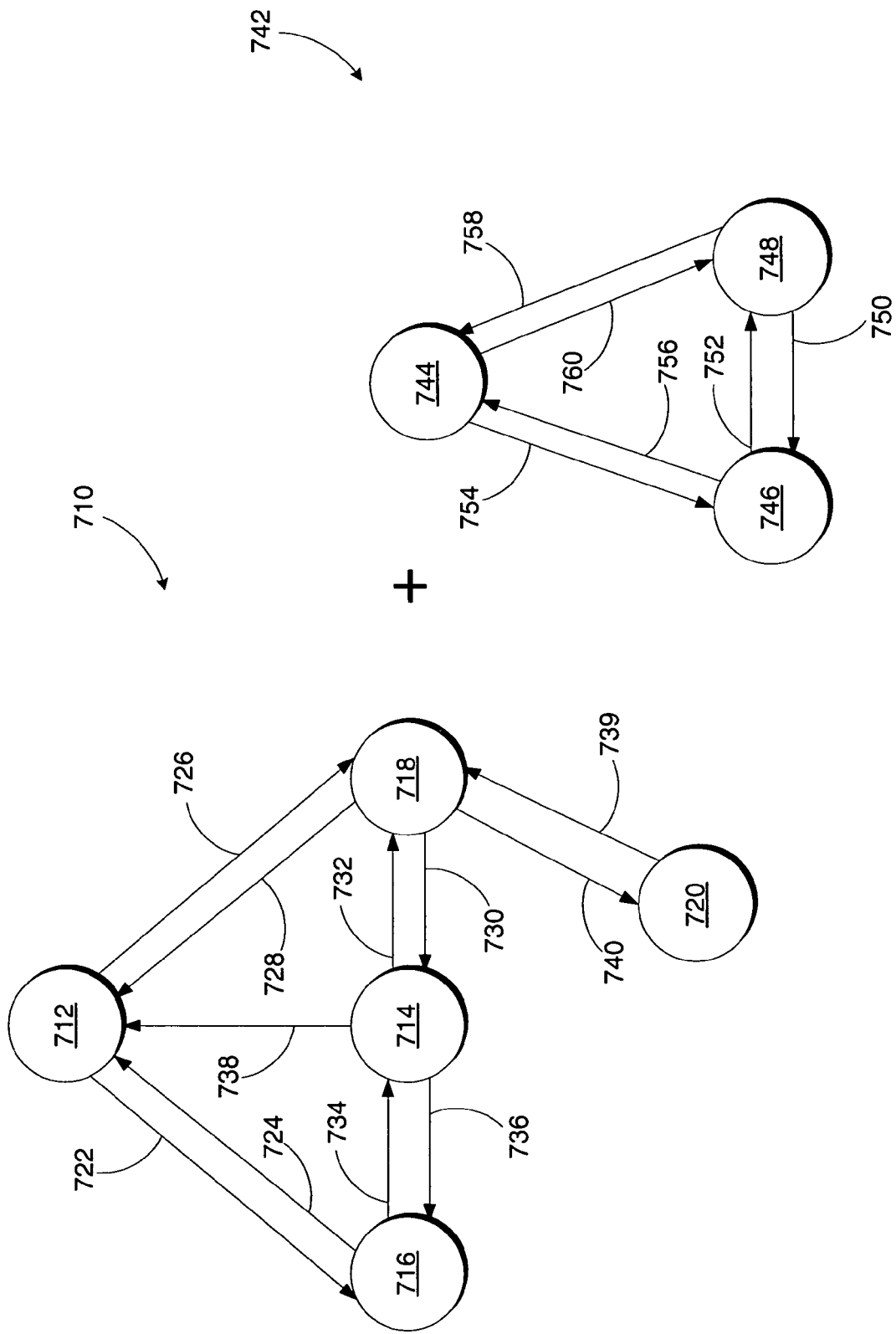
FIG. 7A is a more detailed diagram illustrating bidirectional data-flow requirements in accordance with an embodiment of the present invention.

FIG. 7A is a diagram that illustrates in greater detail relationships between the nodes of two trees to be combined. A first tree 710 is shown that has a top node 712 and a child node 714, which has a previous-sibling node 716 and a next-sibling node 718. Node 718 has a child node 720. Nodes 716 and 718 are also first-child and last-child nodes of parent node 712. Links are depicted between the various nodes of tree 710 that enable navigation between the nodes (tree traversal). Links 722 and 724 relate data between nodes 712 and 716. Links 726 and 728 establish a parent-child relationship between nodes 712 and 718.

Relative links 730 and 732 establish a previous- and next-sibling relationship between nodes 714 and 718. Links 734 and 736 provide a previous- and next-sibling relationship between nodes 716 and 714. Node 714 is denoted as the child node 712 by link 738. Links 739 and 740 provide a parent-child relationship between nodes 718 and 720. Second tree 742 is composed of three nodes—parent node 744, first-child node 746, and last-child node 748. A sibling relationship is established between nodes 746 and 748 by links 750 and 752. Relative links 754 and 756 establish a first-child relationship between nodes 744 and 746. Links 758 and 760 establish a last-child relationship between nodes 744 and 748.

One method for representing tree 712 and tree 742 as a single tree would be to actually graft tree 742 on to tree 710 and then update all the links and notations associated with the affected node(s).

Figure 7B:
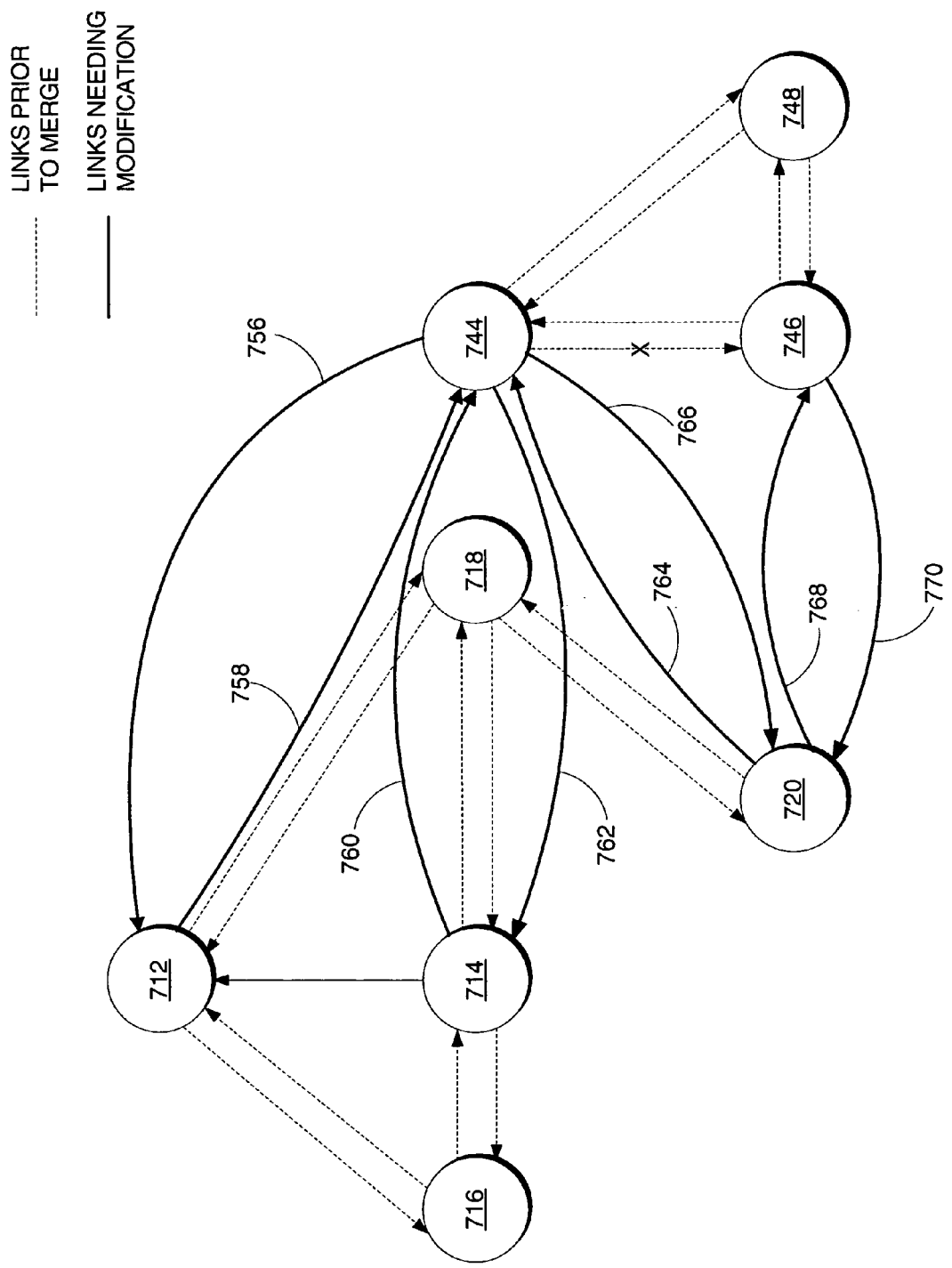
FIG. 7B is a block diagram that illustrates a portion of the problems and disadvantages associated with directly grafting a first tree onto a second tree.

FIG. 7B illustrates a portion of the complexities involved in actually grafting tree 742 on to tree 710. FIG. 7B does not illustrate all of the complexities associated with grafting tree 742 onto tree 710. Rather, FIG. 7B illustrates merely a portion of the complexities that would need to be contemplated and resolved by a developer in connection with grafting tree 742 onto tree 710. In FIG. 7B, the links in a state prior to a tree merge are reflected by dashed lines. The links requiring modification are shown in a heavier line width.

If tree 742 were grafted onto tree 710, then links 756 and 758 would need to be established between nodes 712 and 744 to establish a proper parent/child relationship. A determination would also need to be made as to whether nodes 718 or 744 would be designated as a last child. Links 760 and 762 would need to be established and reconciled so as to establish a sibling relationship between nodes 714 and 744. Node 720, which previously was a lone child node of 718, would need to be updated as a first-child node and as a new previous-sibling node, associated with node 746. Links 764 and 766 would need to be added and reconciled to establish the parent/child relationship between nodes 744 and 720. Links 768 and 770 would need to be established between nodes 720 and 746 to establish a sibling relationship. Node 746, which used to be a first child, would need to be updated to a next and previous sibling.

As previously mentioned, other issues associated with grafting tree 742 onto tree 710 need to be reconciled, but FIG. 7B illustrates a portion of the complexities associated with actually merging two even relatively simple trees. If trees 710 and 742 were more complex than having merely five nodes and three nodes respectively, then even more links, properties, patterns, and notations would need to be updated in connection with merging the two or more trees.

In a method where tree 742 is actually grafted onto tree 710, the task of updating the various links and corresponding properties would fall to the providers 214. If the providers 214 do not accurately update all of the applicable links 320A, properties 320B, and patterns 320C, then requesting component 222 will not be able to navigate through the resulting tree. For instance, consider nodes 720 and 746 of FIG. 7B. If node 720 is not updated to be the first child of node 744, then requesting component 222 may receive bad information that node 746 is the first child of node 744, when it is not. To the extent an application relied on a correct designation of the first child of node 744, that application would produce erroneous results.

In another example, consider links 768 and 770 between nodes 720 and 746 in FIG. 7B. If nodes 768 and 770 are not correctly established, then requesting component 222 may hit a logical wall and be prevented from navigating out of the resulting tree. If an application, such as requesting component 222, cannot navigate out of a logical tree structure, then the application may hang, thereby preventing control from being returned to user 224.

The complexity associated with coding one or more providers 214 capable of updating all of the relevant links 320A, properties 320B and patterns 320C is virtually overwhelming. Such a task would be exacerbated by the fact that different trees have different ways of storing links. That is, a first tree may designate relative links 320A in a first manner but a second tree may designate relevant links 320A in a second manner. Actually merging the two trees would be difficult because of the disparate methods employed for storing links 320A. According to a preferred embodiment, the present invention provides a set of referential links between a hosted and a hosting node as illustrated in FIG. 7C.

Figure 7C:
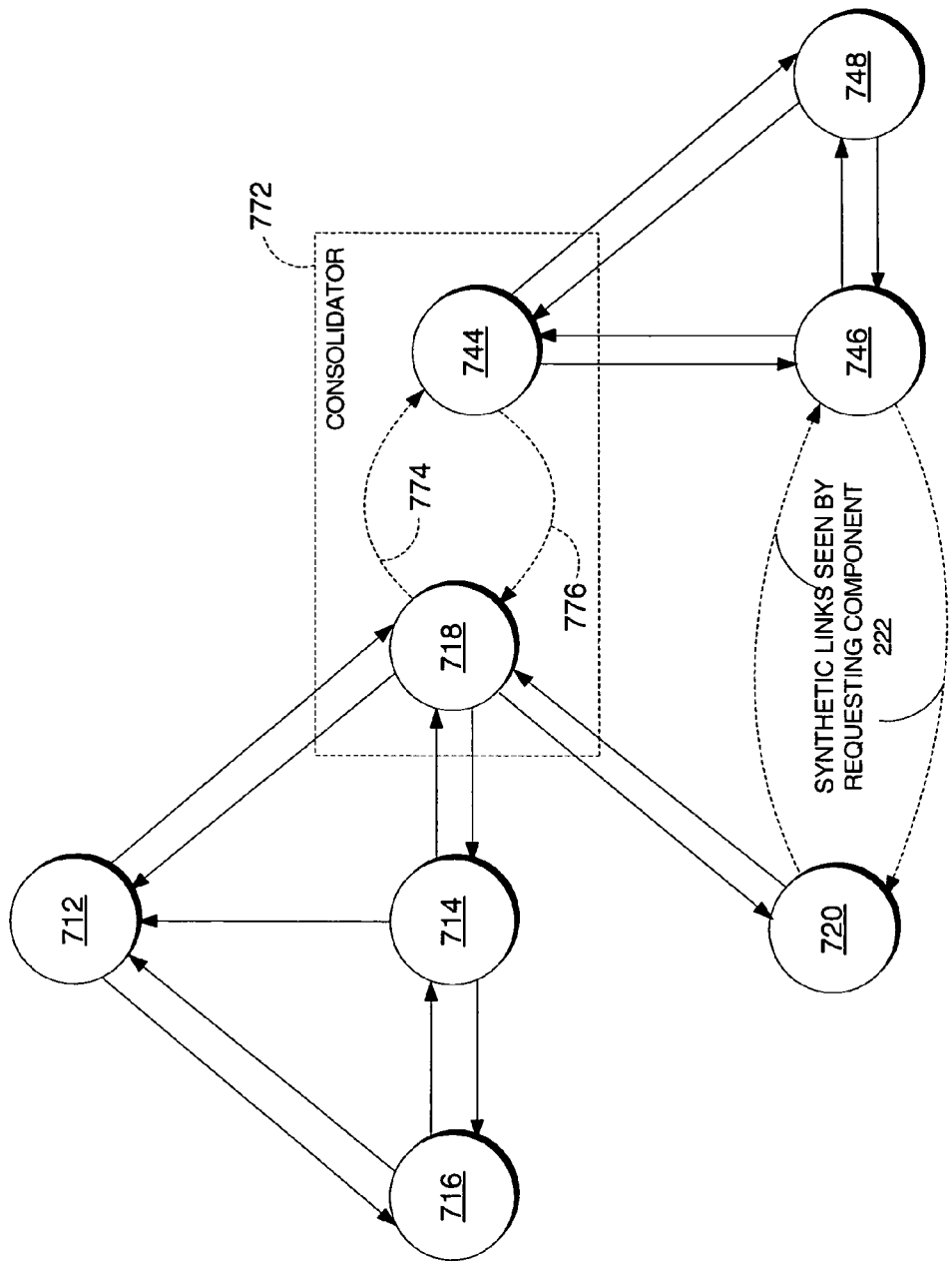
FIG. 7C is a block diagram illustrating a merging of two trees in accordance with an embodiment of the present invention.
Figure 8:
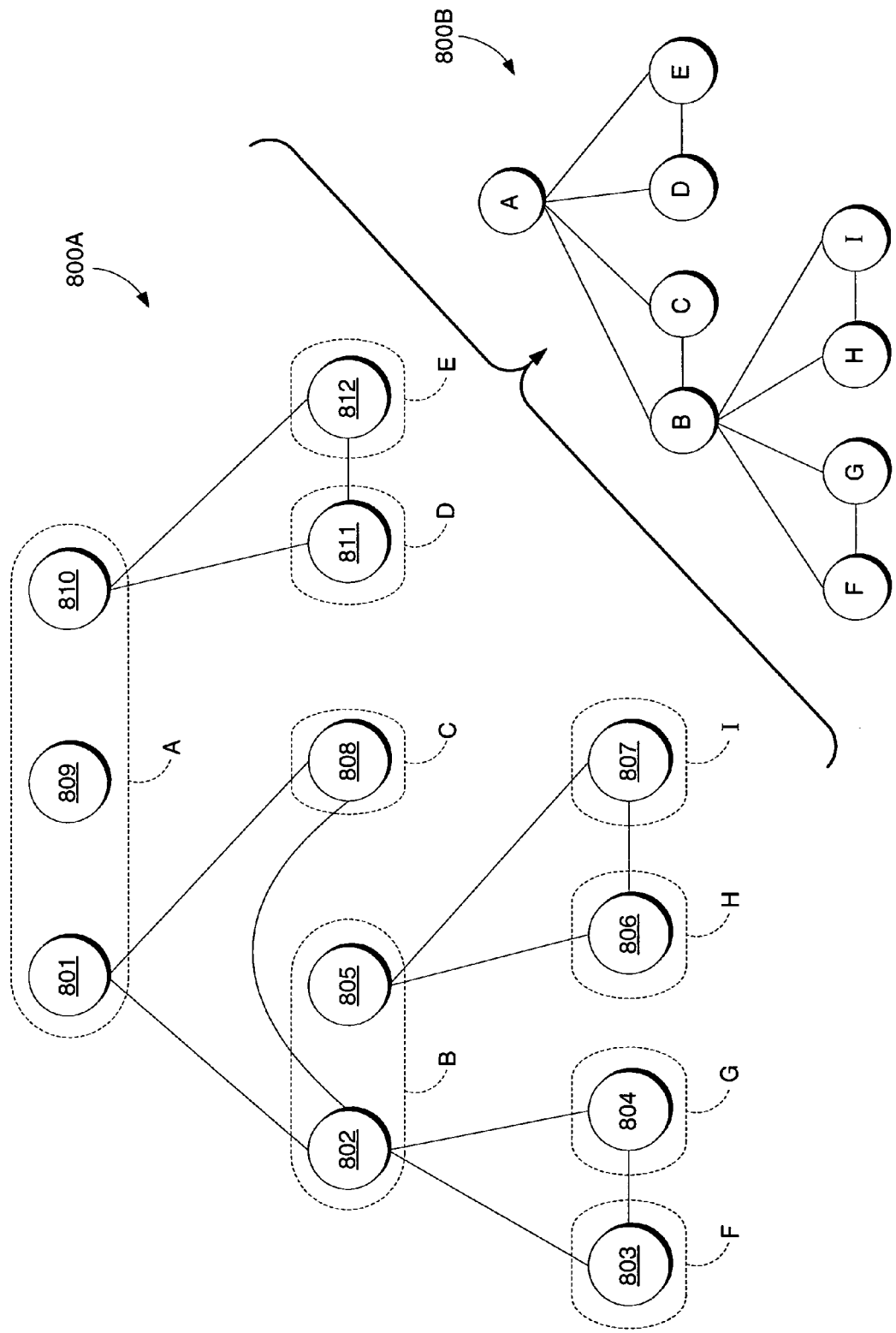
FIG. 8 is a block diagram illustrating how consolidators are used to traverse a merged tree in accordance with an embodiment of the present invention.

As shown, FIG. 7C illustrates that intermediary interpreter 218 merges the patterns, properties, and links of nodes 718 and 744. This merging is referenced generally by consolidator 772. As previously mentioned, intermediary interpreter 218 includes one or more consolidators. A consolidator is a representation of a single node (as illustrated in FIG. 8) or a logical merge of two or more nodes. Consolidators embrace technical schemes where a user interface, such as user interface 210, is composed of heterogeneous trees of elements 210 and enables a client to view these heterogeneous trees as a single tree.

As described above, information for a particular piece of user interface 210 often comes from multiple sources. For example, in the case of a button on a screen, the location, visual state, enabled/focused information, etc., may come from an underlying user-interface framework. The fact that the element is a button and can be pressed is information derived from the control itself. Still further, another software application may have information about the purpose of this button within the context of the overall application. Intermediary interpreter 218 remedies the information disparities by logically merging properties and patterns together using a method that employs a multiple-provider architecture.

In this manner, a first referential link 774 indicates that node 744 is being hosted by node 718. A second referential link 776 indicates that node 744 is being hosted by node 718. Incident to receiving a request from requesting component 222, intermediary interpreter 218 identifies one or more trees that are to be represented as a single tree. Intermediary interpreter 218 then provides first and second referential links 774 and 776. Consolidator 772 then acts as a merging agent between the two trees. For example, when node 712 attempts to communicate with its last child node, intermediary interpreter 218 provides feedback to the relevant nodes that the nodes are communicating with a set of merged nodes. Thus, requesting component 222 would perceive communications pathways between nodes 718 and 748 of FIG. 7C because consolidator 772 makes nodes 718 and 744 appear to be a single entity rather than as two nodes. Consolidator uses referential links 774 and 776 as a source of information to represent nodes 718 and 744 as a single node. Accordingly, a data structure is provided to requesting component 222 composed of a first representation of tree 742 and a second representation of tree 710 to make the two representations appear as a single hierarchal structure to requesting component 222.

A benefit of this approach is that it simplifies the task of providing information to a requesting component, such as requesting component 222. Each provider need only expose the information it is aware of, allowing other providers to provide other information. No longer do the providers 214 need to facilitate subclassing or wrapping existing providers to navigate the hierarchal representation. The respective consolidators obtain links 320A, properties 320B and patterns 320C of nodes 718 and 744 such that a client sees only a single node with all the properties, patterns and children from all of the providers 214.

In a preferred embodiment, providers are arranged in order from lowest to highest—the lowest corresponding to the host user-interface component, the highest corresponding to the hosted user-interface component. The terms "lowest" and "highest" as used herein are not limitations but are used to define end points. Conceptually, however, higher providers can be thought of as being stacked on lower ones, with the higher ones taking precedence.

Additional providers can be employed in connection with some embodiments of the present invention to allow software applications or elements to add additional providers. Including these additional providers is optional and should not be construed as a limitation of the present invention. A first exemplary function offered by an illustrative additional provider is to add more information from an application and can be used where an application has additional knowledge that it wishes to expose to intermediary interpreter 218. These providers can be referred to as "override providers" and are logically denoted with the highest precedence. Other providers can add default information for certain user-interface types. For example, most windows of a user interface are capable of containing scrollbars. A "default" provider can be added to provide these scrollbar-related properties so that other providers do not have to. Requesting component 222 sees the aggregated result. These providers preferably take on a lower precedence order. Also, "repositioning providers" allow some elements to add providers specifically to influence the shape of a tree.

In a preferred embodiment, intermediary interpreter 218 constructs sets of providers for a particular user-interface element and treats all providers the same irrespective of what their purpose is, where they come from, or how many providers are present.

To determine an information set such as properties 320B or patterns 320C, intermediary interpreter 218 queries each provider to determine the set that it supports. It then combines the results with the results from the other relevant providers. Duplicate entries are removed. The result is that requesting component 222 sees the union of properties from all providers.

To determine a specific property or pattern, intermediary interpreter 218 queries each provider, from the highest to the lowest, for the requested data (such as a property like "Name," or a pattern like "InvokePattern," which is an object that represents the ability to push a button, for example). When intermediary interpreter 218 receives an affirmative response from a first provider in sequence, it returns those results to requesting component 222 without asking the providers in a preferred embodiment.

Traversing a Tree

Similar to the method for aggregating properties 320B, intermediary interpreter 218 locates parent nodes from the highest to the lowest in a preferred embodiment.

Intermediary interpreter 218 combines child nodes by exposing the children of the lowest providers prior to those of the highest in a preferred embodiment. In alternative embodiments, the order can be reversed as long as the order chosen is employed consistently. When the identification of a first child is requested, intermediary interpreter 218 iterates over the providers from lowest to highest until it identifies one that has a first child, and then uses that. Identifying a last child is similar, except that intermediary interpreter 218 iterates over the providers in the reverse direction—from highest to lowest.

Identifying siblings is somewhat more complicated and will first be described generally and then illustratively with reference to FIG. 8. If intermediary interpreter 218 were to simply look for the first node that had a response for the next or previous link as it does with a parent and first/last child, inconsistencies may develop in the resulting tree. To identify child nodes, intermediary interpreter 218 first determines which node can identify the respective parent. Intermediary interpreter 218 then queries that node for the next or previous sibling, ensuring a consistent tree. If that node replies with a positive response, then the returned node is communicated back to the client.

If the node replies that it does not have a sibling, then processing is not completed. The identification mark could simply be at the end of one provider's collection of children. The parent node may have other providers that are providing other children that should be treated as siblings. Accordingly, intermediary interpreter 218 navigates to the parent and then determines which of the providers in that parent sourced the navigation. Traversal advances in the appropriate direction of the parent's provider list (lowest to highest if looking for next sibling) until the next provider that has children is identified. Once identified, that parent's first child is identified as a next sibling. Similarly, its last child can be identified as a previous sibling if a previous sibling was being sought.

To further explain the methods described above, an example is provided here with reference to FIG. 8. FIG. 8 depicts two trees, 800A and 800B. In FIG. 8, the nodes correspond to providers. Twelve providers are shown as nodes 801-812. Tree 800A is composed of three providers, 801, 809, and 810, logically merged by a consolidator A. Two providers, 802 and 805, are logically merged by consolidator B and appear as a first child of consolidator A. Providers 804, 806-808, and 811-812 are arranged as shown with corresponding consolidators to describe methods consistent with this illustrative embodiment. Each consolidator contains references to one or more providers and can extract information from the providers for a particular user-interface element. Given one provider in a set, the respective consolidator can determine the others by following the referential links (such as links 774 and 776 of FIG. 7C). Tree 800B represents how requesting component 222 sees tree 800A according to the method and data structures of the present invention.

Two main consolidators are depicted in FIG. 8, consolidator A (which logically merges data from three providers) and consolidator B (which logically merges data from two providers). Assume requesting component is at consolidator B within tree 800A and the "next child" is to be identified. First, the provider is identified that knows who the parent is. In this case, provider 802 knows who the parent is. Thus, provider 802 is then queried for its next sibling, responding with "808." From this information, consolidator C is constructed and node 808 is identified.

Now assume that the next child is again to be identified. First, the present invention determines which provider knows the parent. The provider that knows the parent is provider 808. Provider 808 is then queried for its next sibling. This time it cannot identify a next sibling. Accordingly, navigation is made up the tree to parent provider 801. Consolidator A is used to determine which provider (801, 809, or 810) was the applicable parent. In this case, that parent is provider 801. Next, children are attempted to be identified. Provider 809 is queried but passed over because it has no first child. Provider 810 is queried and indicates that it does have children. Further, provider 811 is identified as a first child and consolidator D is constructed. In doing so, traversal has been made from B to C to D. From the perspective of requesting component 222, tree 800A appears as though there was a link between C and D even though those providers may not be aware of one another. This apparent relationship is illustrated in tree 800B. The process described above allows for generic tree traversal, regardless of the starting node.

Certain types of traversal allow the process to be simplified. For example, to identify all the children of node A, the present invention can simply query each of its providers for their children and union the resulting set together. With continuing reference to FIG. 8, consider consolidator A. Node 801 would return {802, 808}, from which consolidators B and C would be constructed. Node 809 would return an empty list. Node 810 would return {811, 812}, from which consolidators D and E would be constructed. Aggregating these results yields the child list {B, C, D, and E}.

Figure 9:
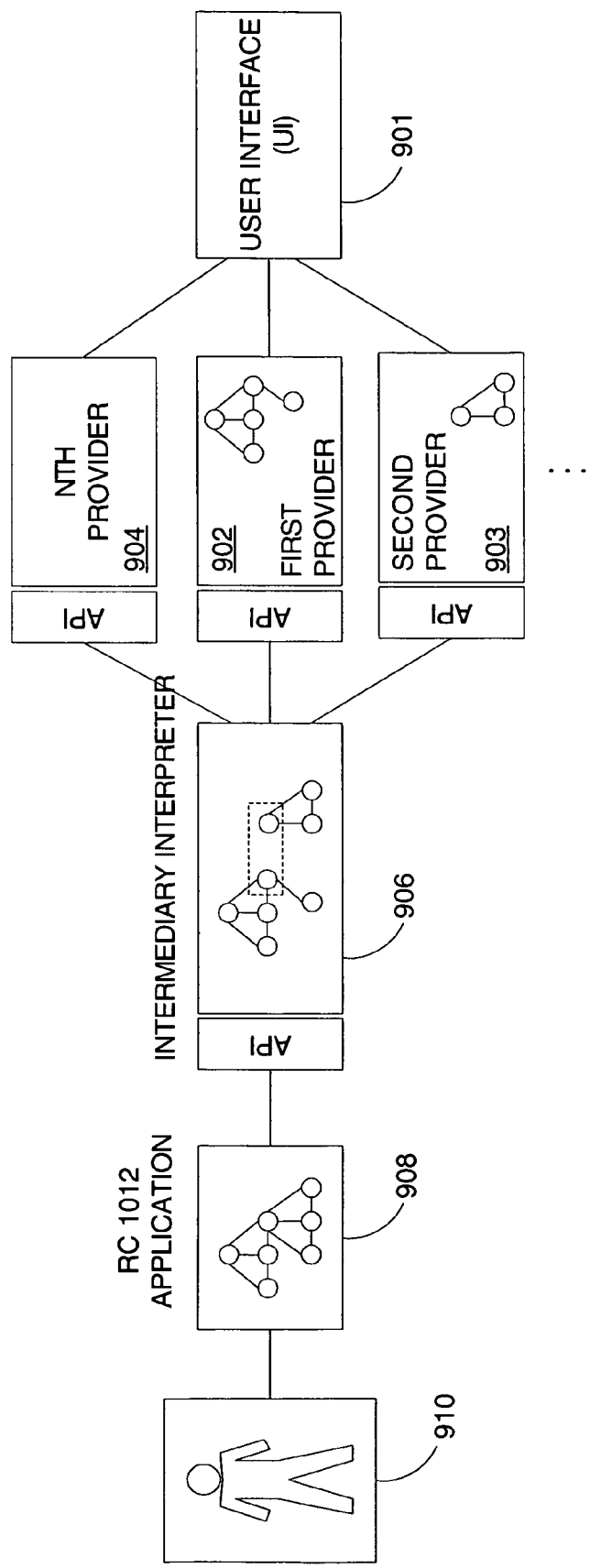
FIG. 9 is a data-flow diagram illustrating that two or more hierarchal structures appear as a single hierarchal structure to a requesting component.

Each of the aforementioned embodiments produces a substantially similar result, which is represented generally in FIG. 9. FIG. 9 depicts a user interface 901 in connection with a first provider 902, a second provider 903 and an $n^{th}$ provider 904. The $n^{th}$ provider 904 illustrates that any number of providers can be used in connection with the present invention. Providers 902, 903, and 904 have corresponding application program interfaces as shown. Each of the providers is coupled to an intermediary interpreter 906, which through its corresponding API communicates with requesting component 908. Requesting component 908 is used by a user 910. Consider an example where user 910 desires that certain components be enlarged or highly contrasted when selected. When user 910 engages a certain action that is supposed to trigger an element-presentation change, requesting component 908 will request information related to a user-interface element to be manipulated. Thus, intermediary interpreter 906 includes a set of instructions that provide the reception of a request for information related to explain one or more elements of user interface 908. Intermediary interpreter 906 also includes a second set of instructions that identifies the various hierarchal trees capable of satisfying a request from requesting component 222. In this example, intermediary interpreter will gather its data from first provider 902 and second provider 903. Using one or more of the technologies described above, intermediary interpreter 906 will utilize a set of instructions to represent the hierarchal structure from first provider 902 and the hierarchal structure of provider 903 to assimilate a representation that makes the respective trees appear to requesting component 908 as a single tree. Intermediary interpreter communicates the representation created to requesting component 908. Requesting component 908 is then provided with a representation that appears to be a single hierarchal structure, which can be used to manipulate the desired user-interface elements. Requesting component 908 is provided with a uniform tree of logical elements and is not aware that a first logical element is receiving properties from a first source and its children or siblings are receiving properties from other sources. This method greatly simplifies the means by which requesting component 908 needs to employ to manipulate desired user-interface elements.

Custom Views and Presentation

As previously mentioned, the prior art does not permit conditions to be sent from a requesting component and thus precludes the possibility of providing customized or predefined views of a raw tree. The present invention solves this problem by providing for the reception of conditions from a requesting component so that a customized view of a set of UI elements can be presented to the requesting component. According to one aspect of the present invention, requesting components (clients) view the UI elements as a set of automation elements that are arranged in a tree structure.

The phrase "automation element" is a proverbial rose that may be known by many names, but is used herein only for referential and explanatory purposes and should not be construed as a term of art or limitation of the present invention. As will be explained in greater detail below, automation element is a mechanism used by an API to expose a node of a logical tree. The automation element provides a way of exposing that node to a requesting component, which can be an application, module, set of instructions, code segment, and the like. As described above, the present invention combines into a unified tree UI element structure of disorganized trees to facilitate easy interaction between a set of UI elements and a requesting component.

The concept of a node is used in the model described herein. Automation element is the way of exposing that model to a requesting component. Thus, the basic type of object that a requesting component interacts with is referred to as an automation element. An instance of this type represents an element that actually appears on a screen or user interface.

Requesting components view UI elements on a desktop as a set of automation elements that are arranged in a tree structure. A root automation element represents a current desktop, which has child automation elements that represent an array of types of UI elements, such as windows, menus, buttons, toolbars, list boxes, radio boxes, combo boxes, menu items, icons, scrollbars, rectangles, and images that make up buttons and toolbars, hyperlinks, etc. Thus, even a button, which does not necessarily contain any items, may have child automation elements that represent the basic UI components that comprise the button, such as text and rectangles.

Tree navigation is accomplished in association with a component referred to herein as "tree walker," again an internal term simply chosen for referential and illustrative purposes. A tree walker component allows a requesting component to filter a raw tree so that the tree appears to contain only automation elements of interest to the requesting component. It then walks that view of the tree by stepping by one automation element to another in a specified direction, such as parent, first child, next sibling, etc. For example, a requesting component could walk a view of the tree that contains only elements that are marked as being controls; or a requesting component could walk a view of the tree that contains only elements that are both visible and have names assigned to them. Thus, the present invention includes the ability to evaluate multiple conditions against several attributes associated with various nodes or automation elements.

In a preferred embodiment, an automation-element tree is not necessarily maintained as a data structure (although it could be). Rather, it preferably reflects a requesting component's view of the world as it steps from one automation element to another in a specified direction. Thus, in a preferred embodiment, the present invention only creates automation elements as required, such as when the client walks to them. Navigating in a particular direction reflects an automation element in that direction at a certain point in time. A different value may be obtained by a requesting component at a different time as a result of changes to the tree. Such a change might occur, for example, by a UI element appearing, disappearing, or moving; applications starting up or closing; or items being added to or removed from lists, etc.

In a preferred embodiment, an automation-element object represents a particular piece of UI, but is not the actual UI itself. For simplicity sake, and capturing alternative embodiments, it is understood that when reference is made for example to "the automation element that currently has the focus," such a phrase contemplates meaning "the automation element that represents the UI element that currently has the focus."

Clients can obtain automation elements in a variety of ways. For example, a requesting component may get the currently focused element using a procedure call to return the currently focused element. Alternatively, a requesting component can reference a point on a screen to determine an automation element. Or, in a final illustrative example, a request can be made for a root element—referred to herein as a "desktop." This element contains the windows of currently running applications as its children. Once a requesting component has an automation element, it can traverse the element tree to reach other automation elements.

Requesting components may register to receive notifications about changes to the state of a user interface. When such a change occurs, the requesting component is notified of the change and is provided with an automation element indicating the affected part of the UI.

Figure 10:
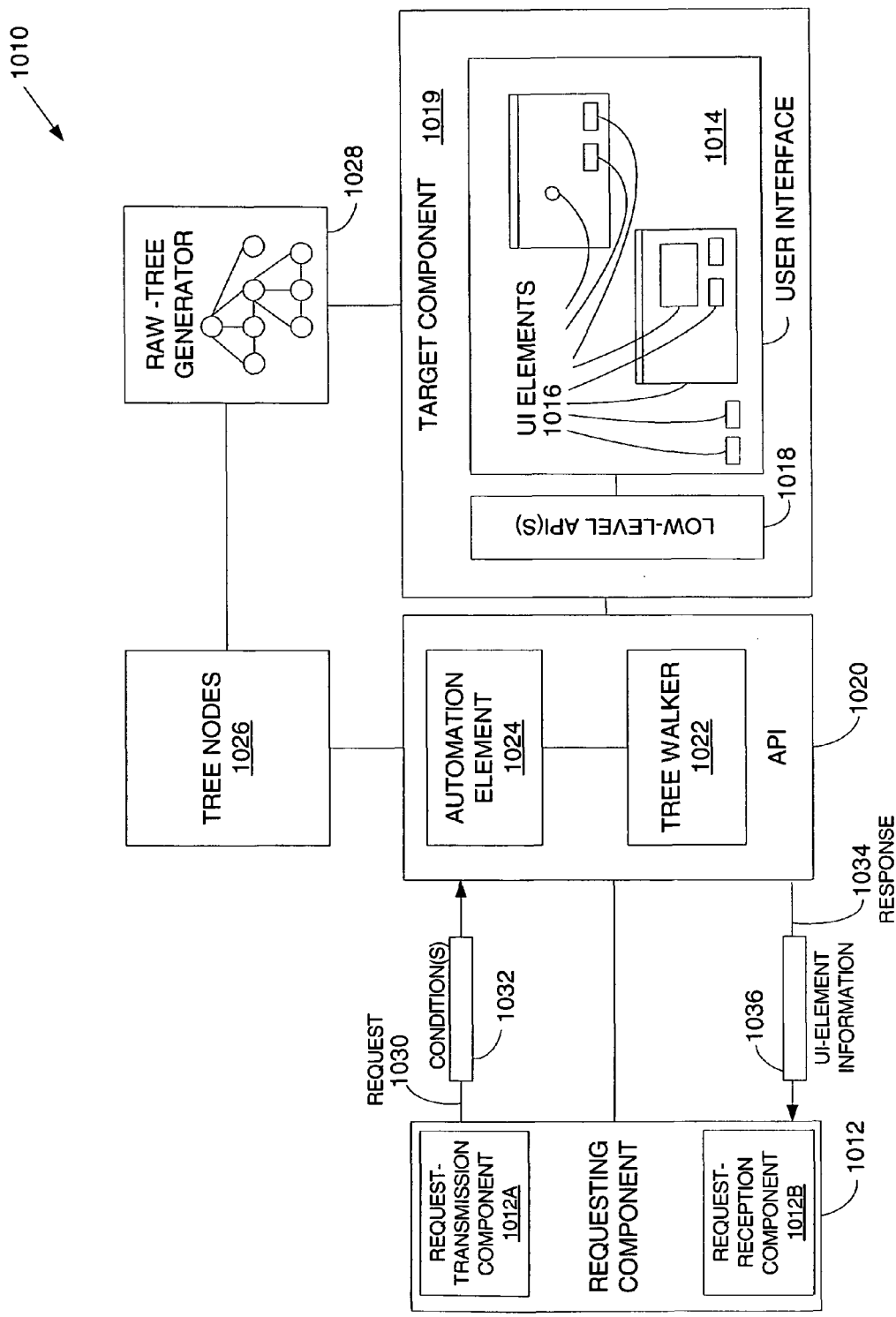
FIG. 10 is a second illustrative operating environment in accordance with an embodiment of the present invention.

Turning now to FIG. 10, a second illustrative operating environment is depicted and referenced generally by the numeral 1010. Operating environment 1010 includes a requesting component 1012 (which includes a request-transmission component 1012A and a request-reception component 1012B) that requests information related to elements of a user interface 1014. User interface 1014 is composed of a variety of UI elements 1016, which, as previously mentioned, include a litany of objects such as textboxes, buttons, windows, shapes, and images that make up buttons, hyperlinks, etc. A set of low-level APIs 1018 can provide functionality to help retrieve information associated with UI elements 1016.

Low-level APIs 1018 are not a required component of the present invention, and are often subsumed within the meaning of a target component 1019. In this embodiment, target component 1019 includes access to low-level APIs 1018 and user interface 1014. An API 1020 helps facilitate calls between requesting component 1012 and target component 1019. API 1020 includes a set of automation elements 1024 and one or more tree-walker components 1022. So as to not obscure the present invention, reference will be made to various devices in a singular fashion, such as an automation element 1024 or tree walker 1022. But the use of singular instead of plural should not be construed as a limitation of the present invention. API 1020 is in communication with a set of tree nodes 1026, which are nodes of a tree generated by a raw-tree generator 1028, the functionality of which has been described earlier in this disclosure. Raw-tree generator 1028 creates a unified hierarchal representation of UI elements of disparate platforms.

Requesting component 1012 submits a request 1030, which includes a set of one or more conditions 1032. Again, conditions 1032 may be referred to herein in singular fashion to ease explanation, but such reference should not be construed as limited to a singular condition. Indeed, the present invention can evaluate multiple conditions against an entire set of UI elements. API 1020 returns a response 1034, which includes UI-element information 1036. Exemplary UI-element information 1036 can include attributes associated with one or more UI elements. Exemplary attributes include properties 320B, patterns 320C, and links 320A (see FIG. 3).

Properties 320B include such items as a UI-element name, such as "OK," "submit," "cancel," etc. Another illustrative property 320B includes an indication as to whether an element currently has the focus. Those skilled in the art understand that for an element to have the focus it is the object of potential input by either a mouse or a keyboard. Another illustrative property 320B includes an indication as to what type of element the element is, for example, a button, list box, or combo box, etc. Once requesting component 1012 has an automation element 1024, it can use it to obtain information about the state of user interface 1014. As is being described, this state information can be exposed via properties.

In one embodiment, each property has an identifier assigned to it. Exemplary nomenclature may include "automation Element.NameProperty" to refer to the name of a UI element. Similarly, AutomationElement.IsFocused refers to a current focus state of a UI element—"true" if the control is currently focused, "false" otherwise. The illustrative property identifiers referenced herein refer to the concept of the property, not necessarily its current value. To determine the current value of a property, a requesting component preferably employs a method on automation element 1025. For example, to get the name of the currently focused control, a client may use the following illustrative statement:

string name=(string) el. GetCurrentPropertyValue
(AutomationElement.NameProperty).

This statement would return a true indication if the currently focused control was an "OK" button, for example. As an alternate form of the above, a more simplified format may be used, such as:

string name=el.current.name.

Other exemplary properties include name, is_focused, is_enabled, control_type, localized_control_type, is_control_element, is_content_element, and keyboard_help_URI. This list is not exhaustive but exemplary in nature.

An automation element may also be associated with one or more patterns 320C. Whereas properties 320B enable requesting component 1012 to discover the current state of the UI, patterns 320C allow a client to interact with the UI, such as UI 1014. Exemplary interactions include invoking an item (e.g., pressing a button, selecting a menu item, or otherwise interacting with the UI that issues a command); selecting or unselecting an item in a list, combo box, or other control; or expanding or collapsing a menu, combo box, or other tree-view item.

Patterns 320C offer the aspect of representing functionality independently of the actual control type. For example, hyperlinks, menu items, and buttons support the "invoke" pattern. This scheme enables requesting component 1012 to access functionality without having to have prior knowledge of the actual type of control. Thus, requesting component 1012 can select or unselect an item irrespective of whether that item is in a list box, a combo box, a tree-view, or some other type of control that supports selection.

An element may support zero or more patterns. Using a pattern is preferably carried out by a two-step process: first, requesting component 1012 determines whether UI 1014 supports the specified functionality. If it does, then it can actually access that functionality. To illustrate by way of example, suppose a client wishes to select an item in a list (assuming it has already obtained an automation element that refers to the desired item). The following code depicted in Table 1 would be illustrative and applicable:

TABLE 1

Exemplary pseudocode for using patterns to select an item in a list

```
AutomationElement item = ...;
//Got the item, now determine whether it supports the ability to be
selected/deselected:
SelectionItemPattern selection = (SelectionItemPattern)
item.GetCurrentPattern(
SelectionItemPattern.Pattern );
if( selection != null )
{
    // yes, this item is selectable - now select it:
    // this is the part that actually accesses the functionality
    item.Select( );
}
```

To press a button, for example, requesting component 1012 would perform a similar two-step process in a preferred embodiment. It would first check that the UI supported the "invoke" pattern, and if an affirmative response is returned, then requesting component 1012 would then actually call the "invoke" method on the invoke pattern to actually press the button.

Exemplary patterns include: the invoke pattern (buttons, menu items, toolbar items); the toggle pattern (the ability to toggle between two or more states, such as checkboxes); the selection pattern (the ability to manage a selection); the selection item pattern (the ability to be part of a selection); the grid pattern (the ability to index children by row and column); the grid item pattern (the ability to determine location within a grid).

As previously mentioned, UI elements 1016 are presented to requesting component 1012 as part of a single tree. In one embodiment, this tree includes all the UI from all the applications of a current desktop. As referred to above, this raw tree includes all elements that are known to the present invention even down to a low level of granularity. This representation would include, for example, elements representing items in a list box, but also the scrollbars on that list box; a button as well as elements representing text and images within the button.

Because this raw tree is potentially at so low a level of granularity, requesting component 1012 would prefer to work with a tree that contains items it is interested in. For example, perhaps requesting component 1012 only wishes to be concerned with items identified as "controls," for example, list items and buttons, but not the text and images that compose the button. Alternatively, perhaps requesting component 1012 wishes only to be concerned with items identified as "content," for example, items in a list, but not the scrollbars or scrollbar buttons associated with the list.

The present invention allows just such a thing. That is, the present invention allows clients, such as requesting component 1012, to view a representation of a portion of the raw tree by specifying one or more conditions, such that all elements that do not satisfy the conditions set are skipped over by the present invention. Only elements that satisfy the condition would be presented to requesting component 1012. In a preferred embodiment, the starting node is always included as a representation. One or more conditions, such as conditions 1032, can be specified in terms of properties having specified values—for example, a client may choose to view the tree in such a way that it contains only nodes that have a specific property set to "true." The present invention would enable the requesting component to traverse a tree using tree walker 1022, which will be described in greater detail below.

Figure 11A:
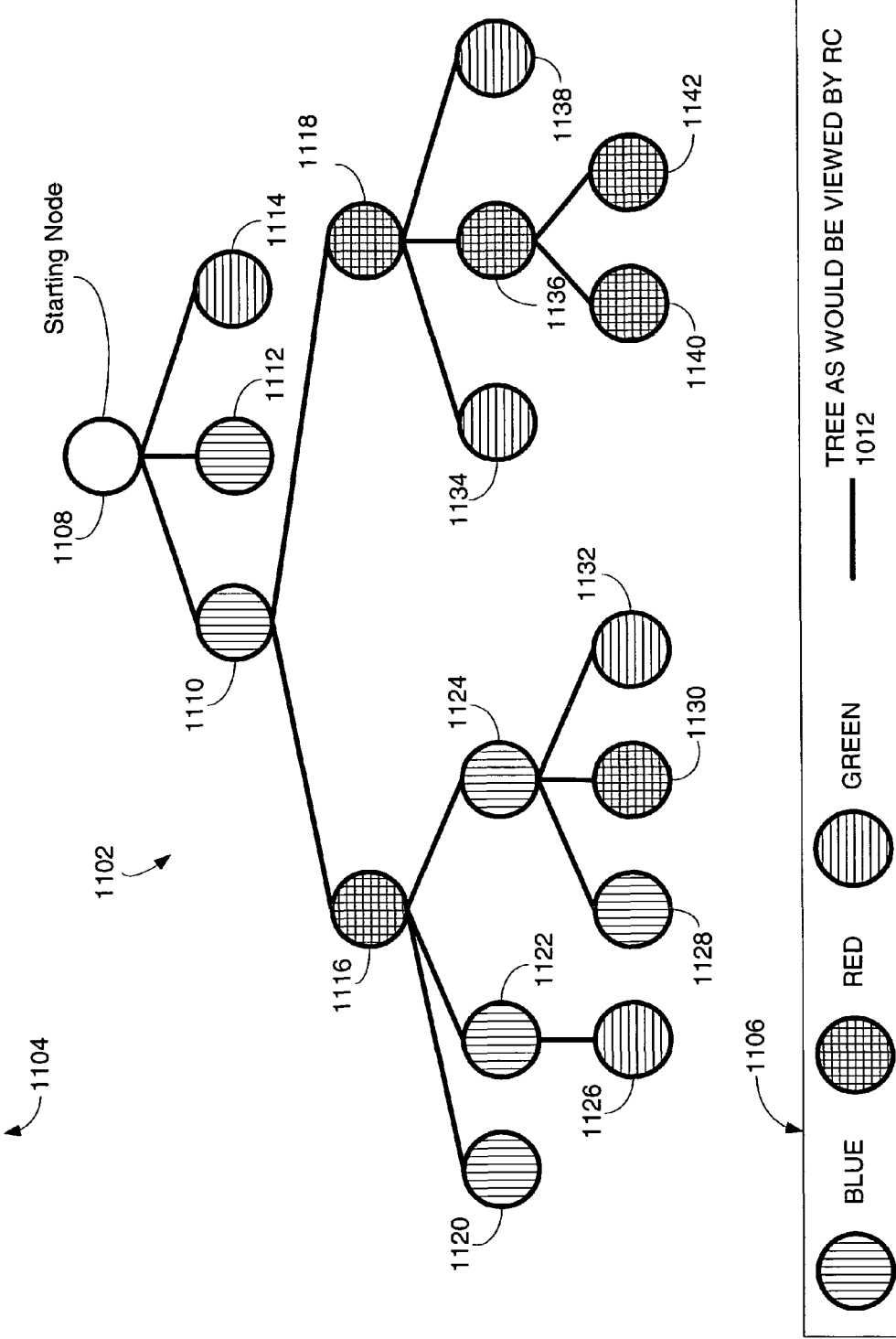
FIGS. 11A-11G show various tree diagrams that illustrate depictions of raw and views of UI elements in accordance with an embodiment of the present invention.

Turning now to FIGS. 11A-11G, various aspects associated with representing a portion of a raw tree subject to conditions 1032 will be discussed. FIG. 11A includes a tree 1102, a condition 1104, and a legend 1106. Tree 1102 would be what has been referred to herein as a raw tree. Here, the condition, is_blue==true OR is_red==true OR is_reen==true is satisfied according to the illustrative tree 1102. Tree 1102 includes nodes that are blue, red, and green. Vertical hashes represent blue nodes, a grid pattern represents red nodes, and horizontal hashing represents green nodes, as depicted in legend 1106. Starting node 1108 would correspond to a desktop. Children nodes to starting node 1108 include nodes 1110, 1112, and 1114. Node 1110 has two children, 1116 and 1118. Node 1116 has three children, represented as nodes 1120, 1122, and 1124. Node 1122 has a single child 1126. Node 1124 has three children, 1128, 1130, and 1132. Node 1118 has three children, nodes 1134, 1136, and 1138. Finally, node 1136 has two children, 1140 and 1142. Automation element 1024 is used to expose the various nodes to requesting component 1012.

Figure 11B:
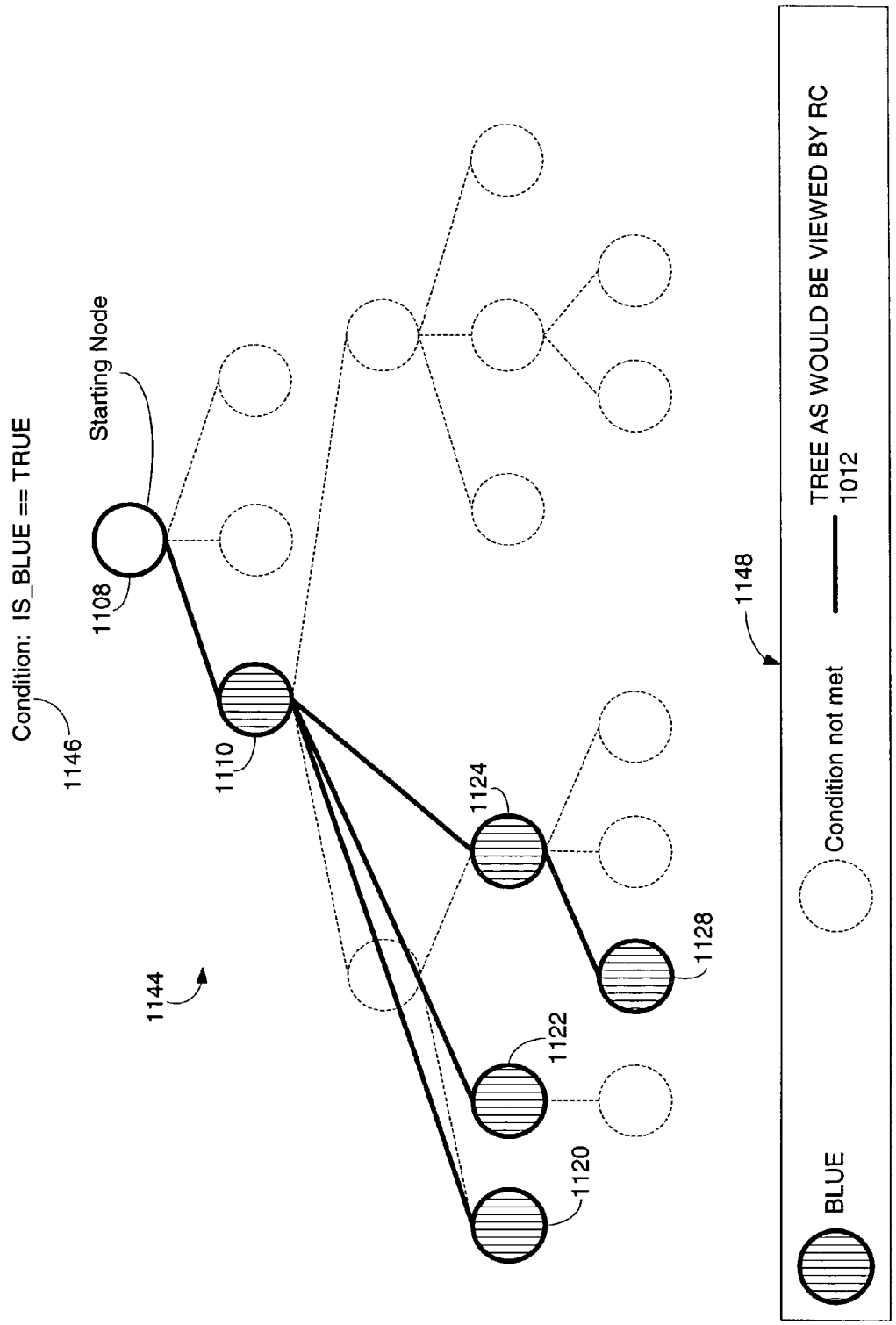
Figure 11C:
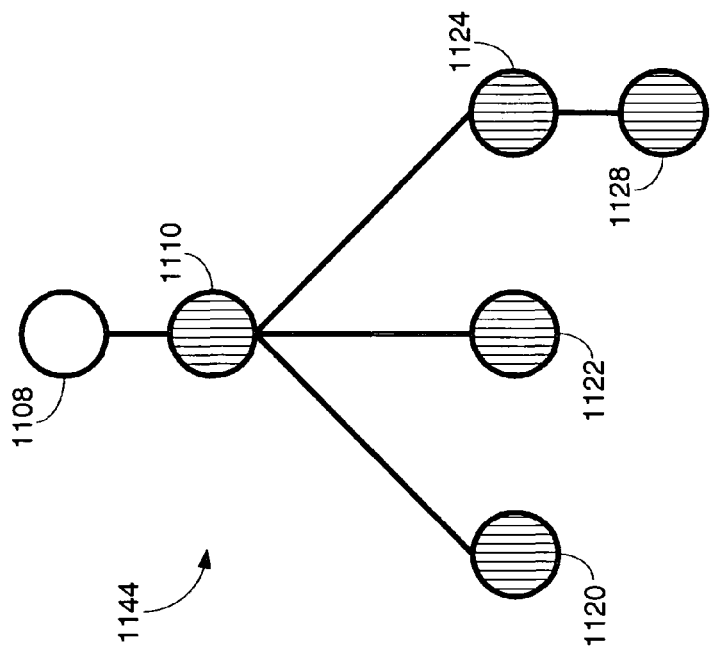

Assume, for example, that requesting component is interested in blue nodes only. Turning to FIG. 11B, a condition 1146 would be submitted by requesting component 1012 indicating that only blue nodes are of interest. The present invention would then prune tree 1102 to produce a tree 1144, which is composed only of blue nodes: 1110, 1120, 1122, 1124, and 1128. As indicated by legend 1148, tree 1144 represented by the heavy-weight lines, is what would be seen by request component 1012. Request component 1012 would be unaware of the red and green nodes, and consequently would not have to include procedures or mechanisms to deal with these nodes. Note that if requesting component 1012 submitted node 1120 as a starting node and requested information regarding the parent of node 1120, then node 1110 would be returned, not node 1116. This is because the present invention would evaluate condition 1146 against node 1116, determine that node 1116 does not satisfy condition 1146, and progress to the next parent, which is node 1110. The present invention would then evaluate condition 1146 against node 1110 and determine that node 1110 does satisfy condition 1146. Therefore, attribute information associated with node 1110 would be returned to requesting component 1012. FIG. 11C more clearly represents tree 1144, not superimposed on tree 1102. Thus, if requesting component 1012 was interested only in blue nodes, instead of having to interact with the complexity of raw tree 1102, it would be presented with a more simple tree, namely tree 1144 of FIG. 11C.

Figure 11D:
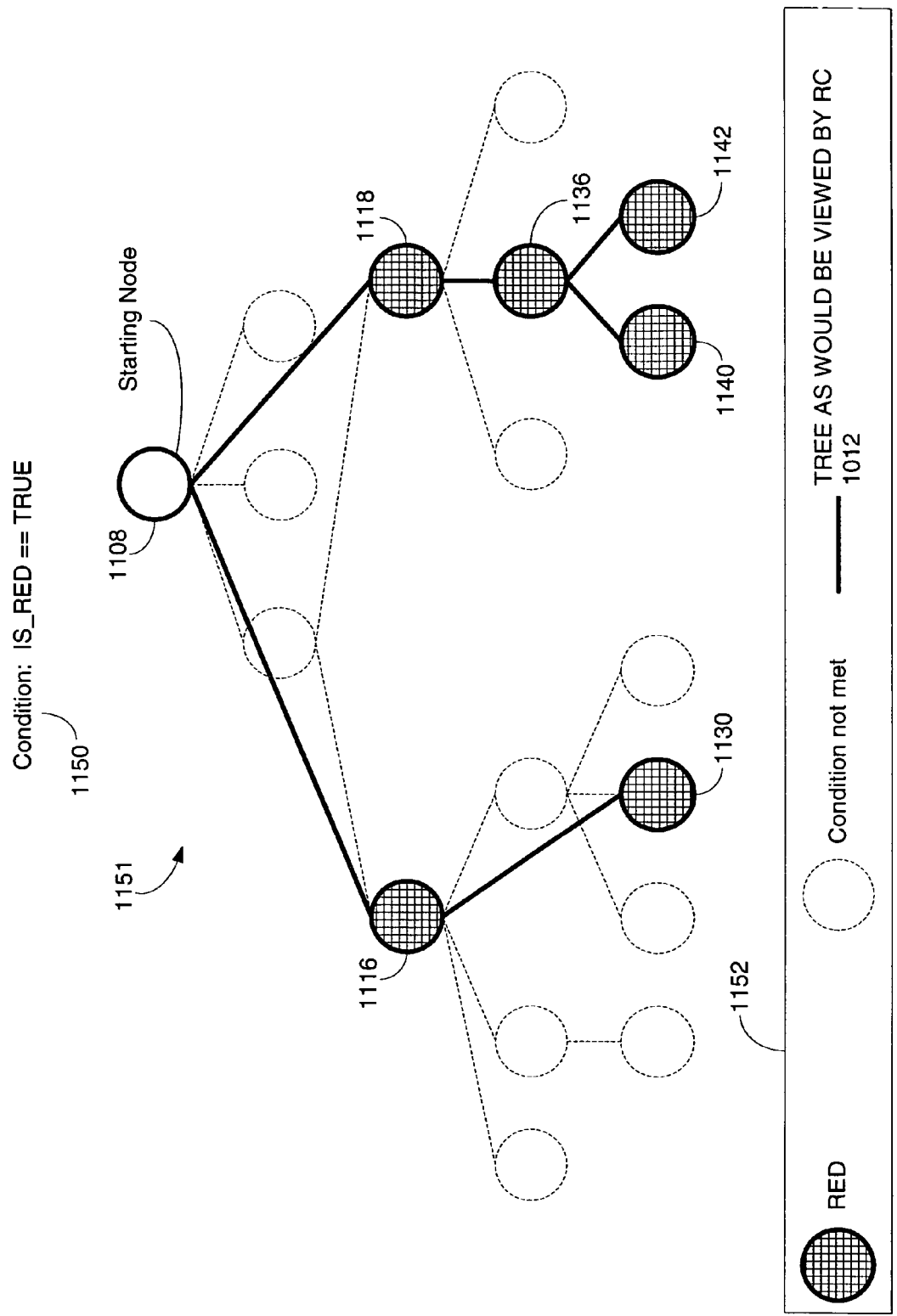
Figure 11E:
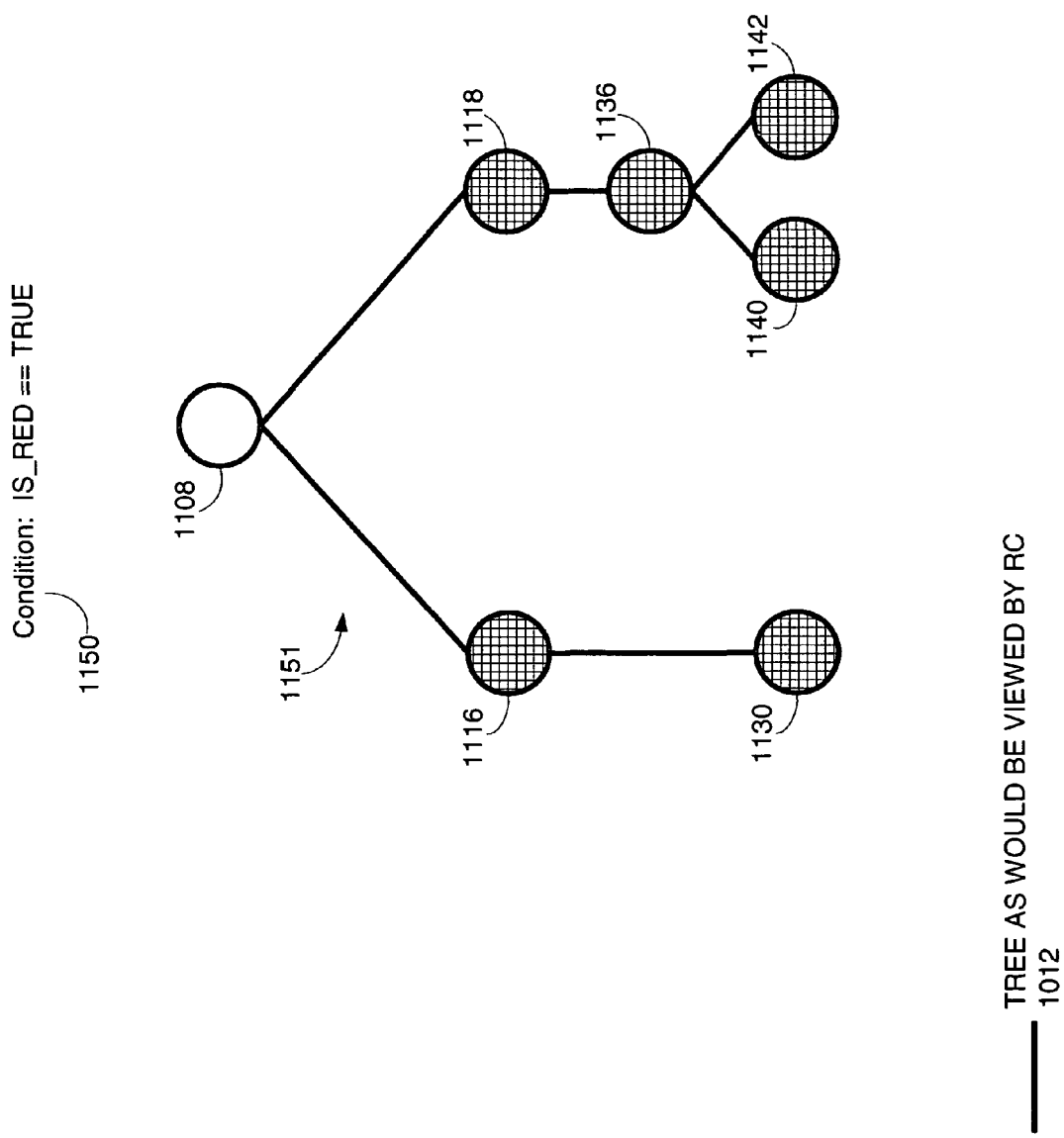

Assume now that requesting component 1012 wishes to only receive information associated with red nodes. Turning to FIG. 11D, a tree 1151 is shown superimposed on tree 1102 subject to condition 1150, which restricts nodes of tree 1102 to only red nodes. The same starting node 1108 is indicated. Thus, instead of having to deal with the complex raw tree 1102, a requesting component would only need to deal with the tree depicted in FIG. 11E, which is considerably simpler than tree 1102.

Figure 11F:
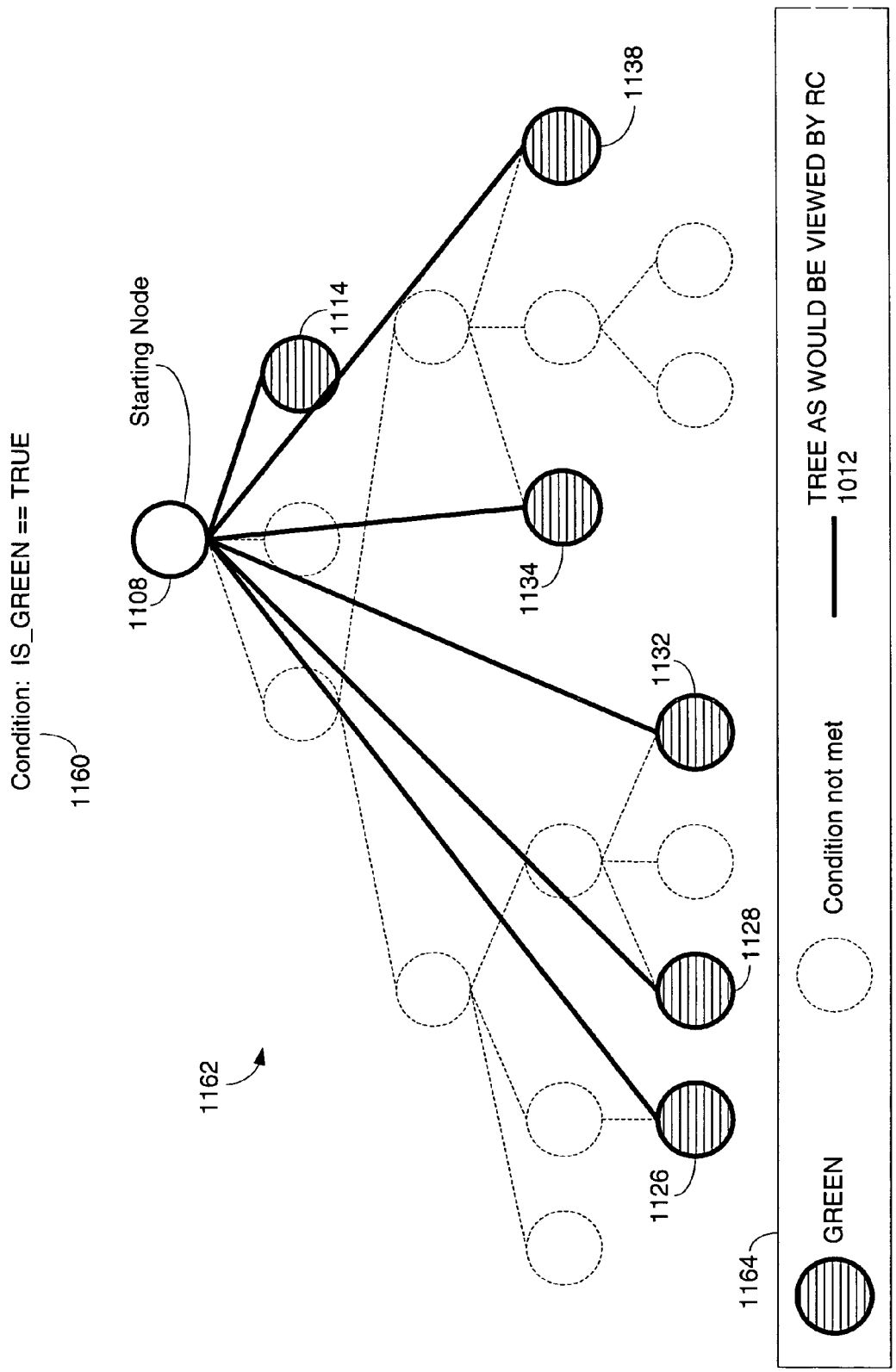
Figure 11G:
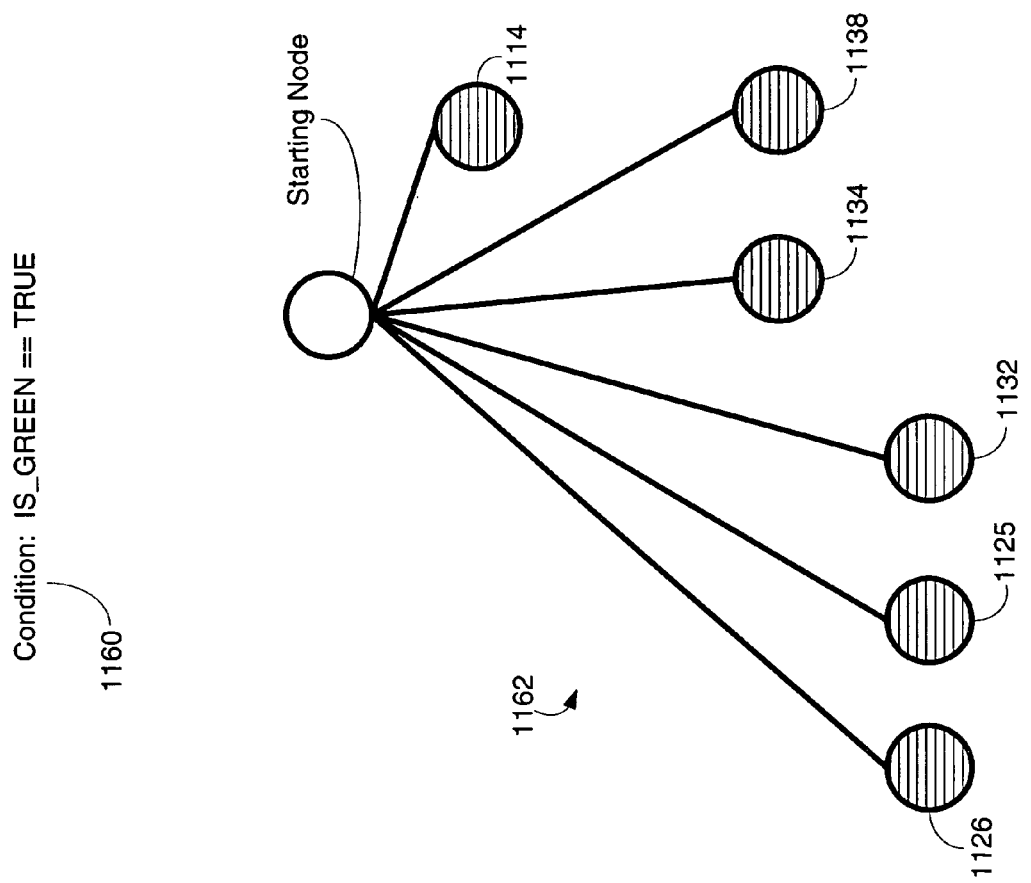

Assume now that the requesting component wishes to see only green nodes. A tree 1162 is depicted in FIG. 11F as superimposed on raw tree 1102 (represented as dashed lines). Condition 1160 indicates that only green nodes are desired, but any of the aforementioned conditions may be applied to retrieve user elements of interest. Tree navigation is greatly simplified. For instance, assume that node 1128 of FIG. 11F is provided as a starting node. If requesting component 1012 requests the next sibling of node 1128, then node 1132 would be returned rather than node 1130. This is because node 1130 does not satisfy the condition 1160. Requesting component 1012 would see node 1162, as represented in FIG. 1I G.

To reduce the level of abstraction associated with FIGS. 11A-11G, consider the exemplary code snippets that follow in Table 2, which highlights navigation of a custom view of a tree, namely a "control" view:

TABLE 2

Exemplary pseudocode to navigate a custom view

AutomationElement start = ...;
AutomationElement el;
TreeWalker walker = TreeWalker.ControlViewWalker;
el = walker.GetParent( start );
el = walker.GetFirstChild( start );
el = walker.GetLastChild( start );
el = walker.GetNextSibling( start );
el = walker.GetPreviousSibling( start );

As illustrated in FIGS. 11A-11G, a custom view is a filtered view of a raw tree that contains only automation elements that satisfy one or more specified conditions. These conditions can be specified by requesting component 1012. In a preferred embodiment, using a custom view does not actually alter the underlying logical tree. Rather, it only affects how requesting component 1012 perceives the structure of the tree. Nodes that do not satisfy the condition are skipped during navigation. Custom views are defined using conditions. These conditions can take on a myriad of forms. For example, a condition may request all UI elements with a specific name. Another condition may request UI elements that have a specific property or attribute. Another condition may request information related to UI elements of a certain shape. It would be impractical to attempt to list all of the different types of conditions that could be provided by requesting component 1012. What is more important is that conditions may be provided by requesting component 1012 and evaluated against a target component 1019. Complex conditions can be constructed using Boolean operators such as "and," "or," and "not." For example, the following condition (illustratively depicted in Table 3) would match elements that have a name of "help" and are not buttons (for example, this may match a "help" menu item, but not a "help" button).

TABLE 3

Exemplary pseudocode to navigate a custom view

Condition testCond = new AndCondition(
　　new PropertyCondition( AutomationElement.NameProperty,
　　"Help");
　　new NotCondition(
　　new PropertyCondition(
　　AutomationElement.ControlTypeProperty,
　　　ControlType.Button ) ) );

Regarding a property condition, the following code snippet indicates a requested filter based on the invoke command:

Condition invokeCond=new PropertyCondition (AutomationElement.IsInvokePatternAvailableProperty, TRUE).

Table 4 illustrates exemplary code to create a tree-walker component that navigates a view defined by a condition. The condition can be passed to the tree walker's constructor:

TABLE 4

Exemplary pseudocode to navigate
the view defined by a condition

Figure 12:
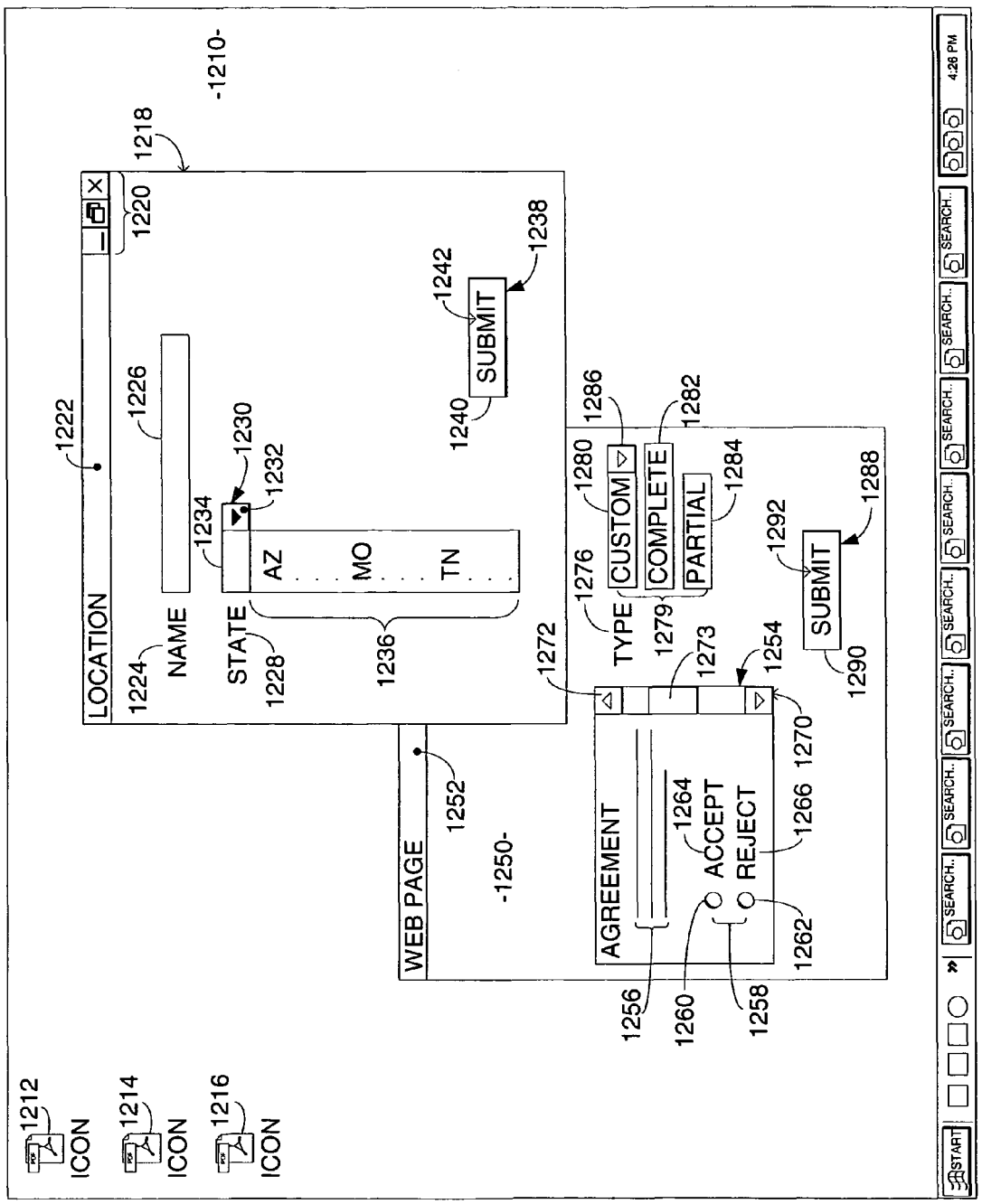
FIG. 12 depicts an exemplary target component in accordance with an embodiment of the present invention.

Condition condition = ...;
TreeWalker customWalker = new TreeWalker( condition );
// Gets the first child of el, under the view specified by the
above condition
AutomationElement child = customWalker.GetFirstChild( el );

Turning now to FIG. 12, an embodiment of the present invention will be explained in still greater detail with reference to the illustrative target component 1210. Target component 1210 represents a desktop, and includes a first icon 1212, a second icon 1214, and a third icon 1216. Still further, a first window 1218 is shown. First window 1218 includes a set of sizing buttons 1220 as well as a title bar 1222. First window 1218 will be referred to as a location window for the sake of clarity. Location window 1218 includes a name label 1224 as well as a name textbox 1226. A state label 1228 is associated with a state drop-down box 1230, which is composed of a rectangle 1234, a drop-down button 1232, and a list of states 1236. Exemplary states shown are "AZ," "MO," and "TN." Location window 1218 also includes a submit button 1238, which is composed of a rectangle 1240 as well as a label 1242.

A second window, a Web page, is referenced generally by the numeral 1250. Web page 1250 includes a title bar 1252 as well as a list box 1254. For illustrative purposes, list box 1254 represents an agreement that a user may need to acquiesce to use a software product. Textbox 1254 includes a set of text lines 1256 as well as a radio-button grouping 1258, which includes an accept option 1260 and a reject option 1262. An accept label 1264 is included along with a reject label 1266 corresponding to their respective options. A scrollbar 1270 is depicted as including an up button 1272, a slider 1273, and a down button 1274. Web page 1250 also includes a drop-down box 1279, which is composed of first, second, and third entries (1280, 1282, and 1284) as well as a drop-down button 1286. Finally, a submit button 1288 is shown as being composed of a rectangle 1290 and a submit label 1292.

Note that not all elements associated with target component 1210 are numbered. Many other elements could also be labeled, but are not for the sake of simplicity and so as not to obscure the present invention.

Figure 13A:
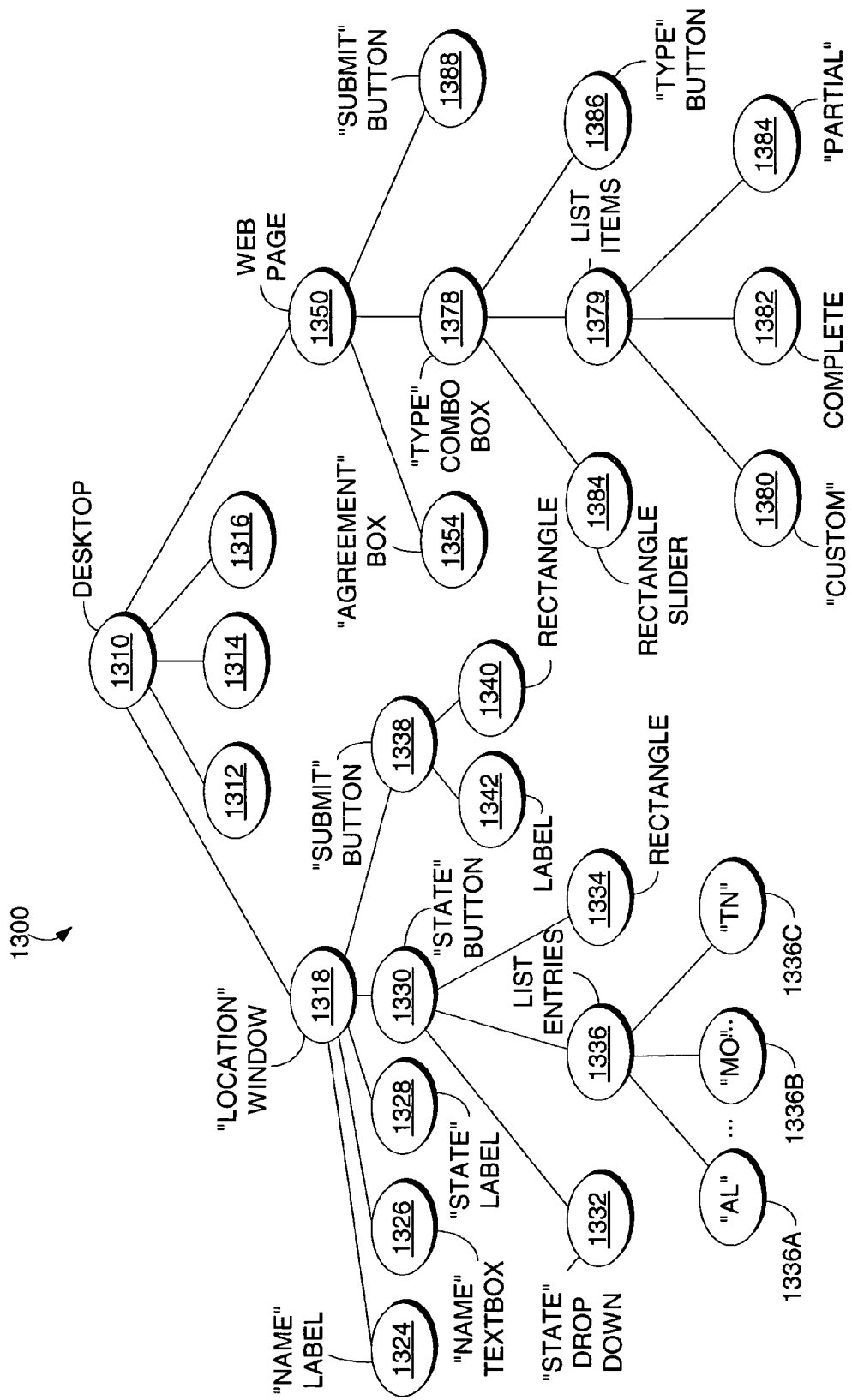
FIG. 13A depicts an illustrative tree structure corresponding to the target component of FIG. 12 in accordance with an embodiment of the present invention.

Turning now to FIG. 13A, wherein like reference numerals correspond to like reference numerals of FIG. 12, a raw tree 1300 represents the various UI elements of FIG. 12 according to an embodiment of the present invention. As shown, raw tree 1300 is composed of elements from various platforms (location window 1318, Web page 1350, etc.). Even though the platforms associated with location window 1318 and Web page 1350 may have incompatible APIs, a requesting component, such as requesting component 1012, would be presented with a first level of simplicity in only having to interface with a single unified tree, namely raw tree 1300.

As mentioned, the numerals of FIG. 13A line up with the numerals of FIG. 12. For example, desktop 1310 in FIG. 13A is denoted as numeral 1210 in FIG. 12. The desktop is represented as having several children, including location window 1318, icons 1312-1316, and Web page 1350. Location window 1318 is shown as having various child elements that correspond to UI elements of location window 1218. Note that node 1330, which represents "state" button 1230, is depicted as having three children, including the drop-down box 1332, the list of entries 1336, and a rectangle 1334. Note further that the list entries of node 1336 are specifically represented as further child nodes, 1336A, 1336B and 1336C.

Figure 13B:
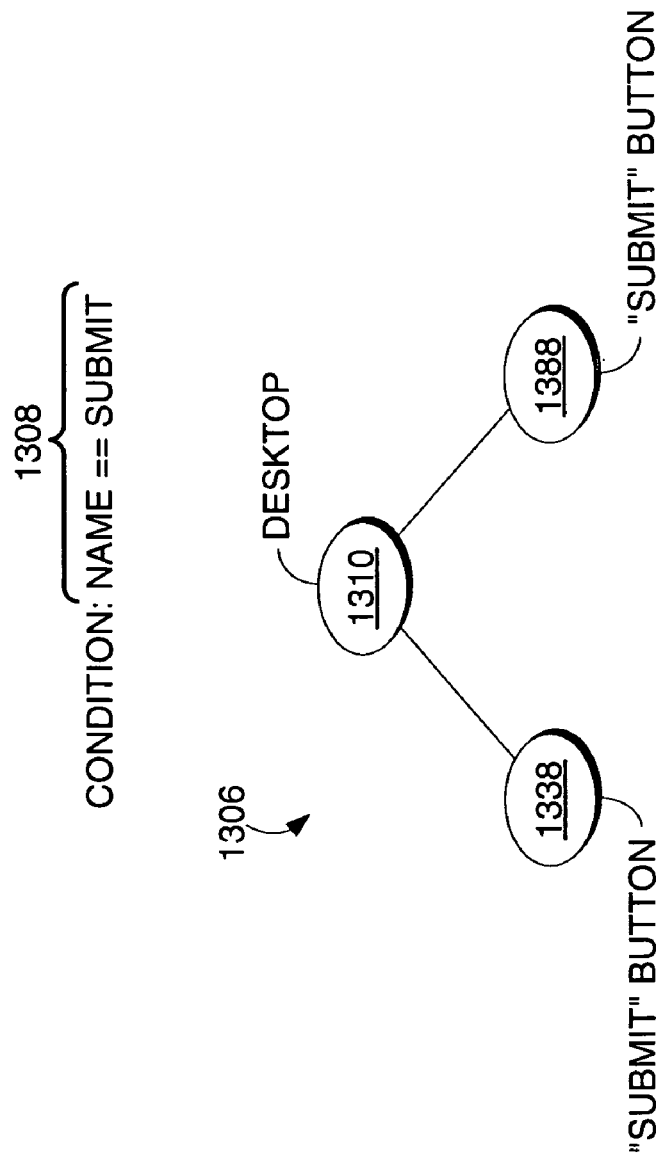
FIGS. 13B-13C depict illustrative custom views of the raw tree of FIG. 13A in accordance with an embodiment of the present invention.

Now assume that requesting component 1012 is concerned with all elements named "submit." Turning to FIG. 13B, a condition 1308 is provided indicating that elements that have an attribute where their name is "submit" is provided. The only elements of raw tree 1300 that satisfy condition 1308 are the nodes associated with submit button 1338 and 1388. Accordingly, filtered tree 1306 is what would be represented to requesting component 1012 rather than raw tree 1300. If requesting component 1012 requested the first and last child of desktop node 1310 with the condition that the element be named "submit," then requesting component 1012 would be presented with tree 1306.

Figure 13C:
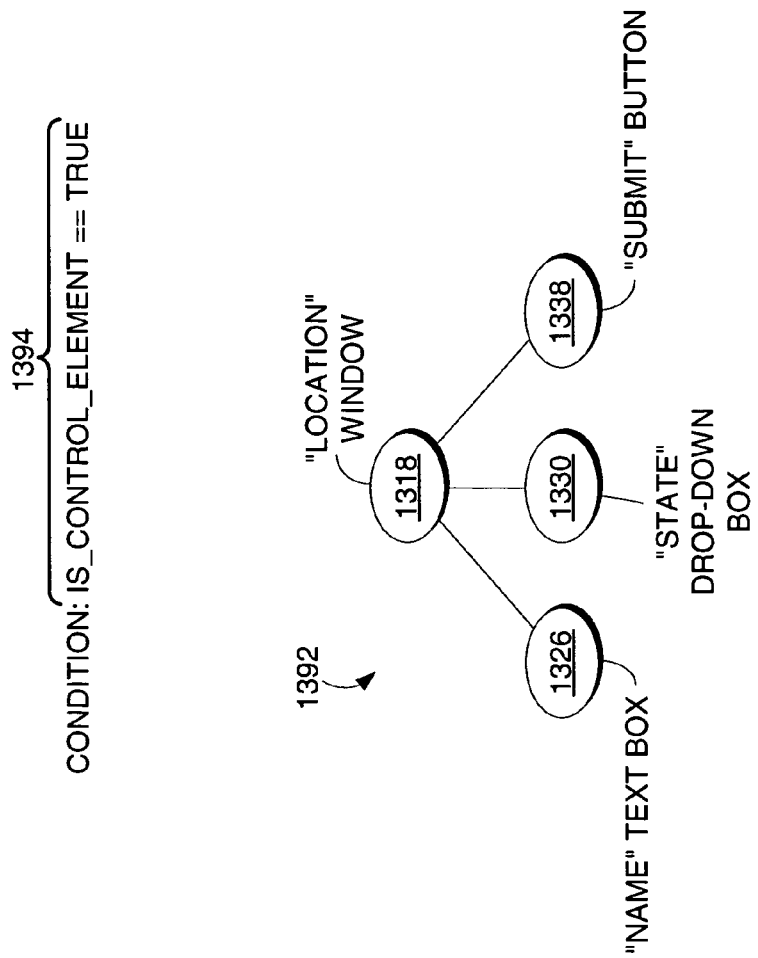

Turning now to FIG. 13C, another filtered tree 1392 is depicted and representative of what would be presented to requesting component 1012 subject to a condition 1394, which requests only elements of location window 1218 that are control elements, such as buttons. The root node, 1318, is preferably always provided. Other exemplary nodes that would be shown would be those that can be clicked on in their own right, for example nodes 1326, 1330, and 1338, which respectively correspond to the "name" textbox, the "state" drop-down box, and the "submit" button. Other control elements, such as individual items of a list box may also be included in tree 1392. Navigating tree 1392 would be substantially easier than navigating raw tree 1300.

We will now provide and explain first an illustrative structure of an API to facilitate functionally described above and second an illustrative pseudocode and examples describing in greater detail how the present invention provides such functionality.

Turning first to Table 5, illustrative pseudocode is provided that highlights exemplary embodiments of programmatic representations of automation element 1024, tree walker 1022, and other components. The pseudocode depicted in Table 5, as well as anywhere in this disclosure, is illustrative in nature and should not be construed as a limitation of the present invention. If a skilled artisan were to quip, he or she would note that the API structure of Table 5 is but one of many ways to skin a cat, that is, to provide the functionality described herein.

TABLE 5

Exemplary API Structure

```
class AutomationElement
{
    // Same set of properties/events/methods as former
    LogicalElement, except:
    // Parent/FirstChild/LastChild/NextSibling/PreviousSibling
    removed
    ...
}
class Automation
{
    ...
    // Predefined conditions for Raw and Control views
    public static readonly Condition RawViewCondition = ...;
    public static readonly Condition ControlViewCondition = ...;
}
class TreeWalker
{
    public TreeWalker( Condition condition );
    // Navigation methods that do not prefetch
    public AutomationElement GetParent( AutomationElement
    element );
    public AutomationElement GetFirstChild( AutomationElement
    element );
    public AutomationElement GetLastChild( AutomationElement
    element );
    public AutomationElement GetNextSibling(
    AutomationElement element );
    public AutomationElement GetPreviousSibling(
    AutomationElement element );
    public AutomationElement Normalize( AutomationElement
    element );
    // Navigation methods that prefetch - see AutomationElement
    Prefetch spec
    public AutomationElement GetParent ( AutomationElement
    element, CacheRequest
request );
    public AutomationElement GetFirstChild( AutomationElement
    element,
CacheRequest request );
    public AutomationElement GetLastChild( AutomationElement
    element,
CacheRequest request );
    public AutomationElement GetNextSibling( AutomationElement
    element,
CacheRequest request );
    public AutomationElement GetPreviousSibling(
    AutomationElement element,
CacheRequest request );
    public AutomationElement Normalize( AutomationElement
    element, CacheRequest
request );
    // Predefined walkers for Raw and Control views
    public static TreeWalker RawViewWalker = ...;
    public static TreeWalker ControlViewWalker = ...;
}
```

TABLE 5-continued

Exemplary API Structure

```
class CacheRequest
{
    // See AutomationElement Prefetch spec for other
    properties/methods
    ...
    Condition TreeFilter { get; set; }
}
//
// Conditions - Used to define custom views
class PropertyCondition
{
    PropertyCondition( AutomationProperty property, object val );
    AutomationProperty Property { get; }
    object Value { get; }
}
class AndCondition
{
    AndCondition( params Condition [ ] conditions );
    Condition [ ] GetConditions( );
}
class OrCondition
{
    OrCondition( params Condition [ ] conditions );
    Condition [ ] GetConditions( );
}
class NotCondition
{
    NotCondition( Condition condition );
    Condition { get; }
}
```

Working through the pseudocode of Table 5, an instantiation of the automation element class is provided, which can be automation element 1024 in some embodiments. Automation element 1024 is the mechanism used by the API of Table 5 to expose a node, which can be a piece of UI (button, list, window, rectangle, text, button, image, etc). Automation element includes methods to allow access to properties 320C (such as "get properties," is focused, is focusable . . . ).

The Automation class can be used to refer to predefined views, such as a "control" view.

An instantiation of the TreeWalker class is provided, which can be tree walker 1022 in some embodiments. Tree walker 1022 preferably includes methods that facilitate tree navigation in a specified direction. It accepts one or more conditions as shown, and then uses the methods shown (GetParent, GetFirstChild, etc.) to evaluate the condition against various UI elements.

Exemplary conditions are also provided. A property condition, and several Boolean conditions are shown to illustrate various standards or requirements to be satisfied by UI elements.

We will now discuss in greater detail how the present invention provides the various aspects of the aforementioned functionality. Given an underlying raw tree (such as raw tree 1300 for example), primitives for navigating over it (Parent, FirstChild, NextSibling), and one or more conditions that indicate whether a given node should appear in a desired view of the tree, operations can be constructed to return the corresponding nodes on the filtered view of the tree.

Three operations are elaborated on here because they are illustrative of other functional aspects described herein. The purely illustrative names of these operations used herein for referential purposes will be GetViewParent, GetViewFirstChild, and GetViewNextSibling. These operations can use any node as a starting point, and will traverse the portions of the tree necessary to find the result. Three internal helper methods: TryAsParent, TryAsFirstOrNext, and TryContinuedNext are also respectively included. No state needs to be maintained between calls to these operations.

In a preferred embodiment, an API is provided that includes code that effects the pseudocode depicted in the Table 6. In a preferred embodiment, the code is tail recursive—recursive calls would have no code following then in the calling function. Such a scheme enables the technology to be embodied differently and converted to other implementations, such as an iteration-and-table-based finite state machine.

Turning to Table 6, a portion of the API relating to GetViewParent is provided.

TABLE 6

Exemplary pseudocode of an embodiment of GetViewParent, GetViewFirstChild, GetViewNextSibling

```
// Make the initial step in the direction of the parent...
Node GetViewParent( Node node )
{
    Node tentative = Parent( node );
    if( tentative != NULL )
        return TryAsParent( tentative );
    return NULL;
}
// keep walking upwards till one of the parents satisfies the
condition...
Node TryAsParent( Node node )
{
    if( SatisfiesCondition( node ) )
        return node;
    Node tentative = Parent( node );
    if( tentative != NULL )
        return TryAsParent( tentative );
    return NULL;
}
// Make the initial step in the direction of first child...
Node GetViewFirstChild( Node node )
{
    Node tentative = FirstChild( node );
    if( tentative != NULL )
        return TryAsFirstOrNext( tentative );
    return NULL;
}
// Keep walking down through nodes till we find one that
satisfies the
condition...
Node TryAsFirstOrNext( Node node )
{
    if( SatisfiesCondition( node ) )
        return node;
    Node tentative = FirstChild( node );
    if( tentative != NULL )
        return TryAsFirstOrNext( tentative );
    // If we hit the bottom, need to instead look sidewards for
    a node that
satisfies
        // the condition...
        return TryContinuedNext( node );
}
// Make initial step in direction of next sibling...
Node GetViewNextSibling( Node node )
{
    Node tentative = NextSibling( node );
    if( tentative != NULL )
        return TryAsFirstOrNext( tentative );
    // If no next sibling, check for a parent
    Node parent = Parent( node );
    if( parent == NULL )
        return NULL;
    // If parent satisfies condition, then it really is a parent
    node in the view
    // of the tree,
    // so there's no sibling to be found
    if( SatisfiesCondition( parent ) )
        return NULL;
    // Otherwise, step up and through the parent to look for a
    potential next
sibling
        return TryContinuedNext( parent );
```

TABLE 6-continued

Exemplary pseudocode of an embodiment of GetViewParent, GetViewFirstChild, GetViewNextSibling

```
}
// Step through this node - forwards, then upwards, looking for
a next sibling or
first
// child that satisfies the condition
Node TryContinuedNext( node )
{
    Node tentative = NextSibling( node );
    if( tentative != NULL )
        return TryAsFirstOrNext( node );
    Node parent = Parent( node );
    if( parent == NULL )
        return NULL;
    if( SatisfiesCondition( parent ) )
        return NULL;
    return TryContinuedNext( parent );
}
```

Figure 14:
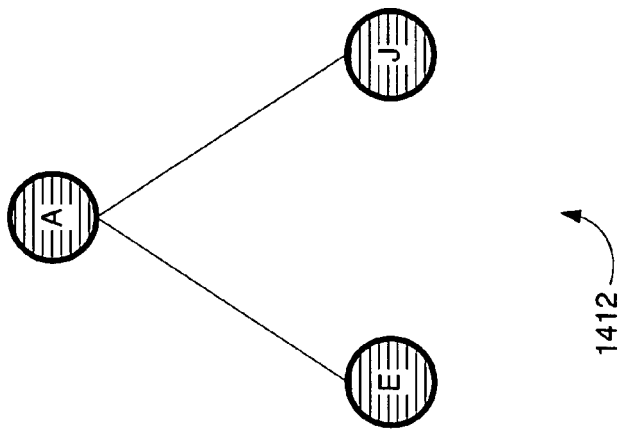
FIG. 14 depicts an illustrative raw tree and a corresponding custom view of that tree per a condition in accordance with an embodiment of the present invention.
Figure 14:
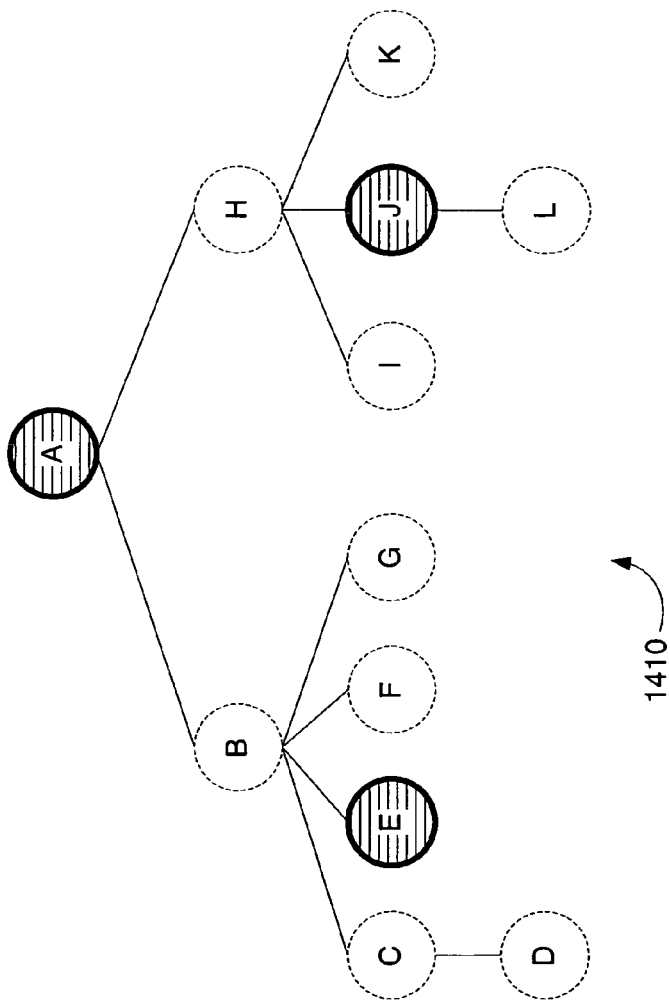

An illustrative example of implementing the pseudocode of Table 6 as it relates to GetViewParent is provided with reference to FIG. 14 to pass information related to the parent of the UI element associated with node E. The steps followed are illustrated in Table 7 below.

TABLE 7

Determination of Node E's conditional parent (See FIG. 14)

| Action | Result |
|---|---|
| GetViewParent( E ): | Parent( E ) is B, call TryAsParent( B ) |
| TryAsParent( B ): | Condition( B ) fails. Parent( B ) is A, call TryAsParent( A ) |
| TryAsParent( A ): | Condition( A ) succeeds, RETURN A |

Starting node E is received. The parent of node E in raw tree 1410 is determined to be node B. The TryAsParent method (Table 6) is called on node B of raw tree 1410. Whatever condition 1032 (FIG. 10) was provided to create custom tree 1412 is evaluated against node B. Node B does not satisfy the condition. Thus, node B's parent is sought and identified as node A. The provided condition 1032 is evaluated against node A, which succeeds. Thus, node A is returned to the applicable requesting component 1012.

An illustrative example of implementing the pseudocode of Table 6 as it relates to GetViewFirstChild is provided with further reference to FIG. 14 to provide information related to the first child of node A of raw tree 1410. The steps followed are illustrated in Table 8 below.

TABLE 8

Determination of Node A's conditional first child - (See FIG. 14)

| Action | Result |
|---|---|
| GetViewFirstChild( A ): | FirstChild( A ) is B, call TryAsFirstOrNext ( B ) |
| TryAsFirstOrNext( B ): | Condition( B ) fails. FirstChild( B ) is C, call TryAsFirstOrNext( C ) |
| TryAsFirstOfNext( C ): | Condition( C ) fails. FirstChild( C ) is D, call TryAsFirstOrNext( D ) |
| TryAsFirstOfNext( D ): | Condition( D ) fails. FirstChild( D ) is NULL. Call TryContinuedNext( D ) |
| TryContinuedNext( D ): | NextSibling( D ) is NULL. Parent( D ) is C, Condition( C ) fails, call TryContinuedNext( C ) |
| TryContinuedNext( C ): | NextSibling( C ) is E, call TryAsFirstOrNext( E ) |
| TryAsFirstOrNext( E ): | Condition( E ) succeeds, RETURN E |

Calling FirstChild on node A returns node B. Condition 1032 is evaluated against node B by calling TryAsFirstOrNext and passing an identifier that identifies node B. The condition fails, as indicated by legend 1414. Next in this embodiment, the FirstChild of node B is determined to be node C of raw tree 1410. Method TryAsFirstOrNext is called on node C.

Node C of raw tree 1410 does not meet condition 1032. Continuing to progressively identify children of nodes that do not meet condition 1032, the FirstChild method called on node C to identify node D. Having identified node D, the TryAsFirstOrNext method is called on node D in a preferred embodiment.

Node D of raw tree 1410 also does not meet condition 1032. But now, the FirstChild method on node D returns NULL. Accordingly, the TryContinuedNext method is called on node D. By way of executing method TryContinuedNext on node D, NextSibling (D) returns NULL. Having hit an isolated node (node D), its parent is identified by invoking the Parent method on node D, which returns C. The Parent method is invoked, rather than merely recalling node D as C's parent, because raw tree 1410 is dynamic, and possibly may have changed. This is also why condition 1032 is (re)evaluated against node C. Node C does not meet condition 1032. Thus, the TryContinuedNext method is called on node C.

Calling TryContinuedNext on node C reveals that the next sibling of node C is node E. Thus, TryAsFirstOrNext (E) causes condition 1032 to be evaluated against node E. With the condition being satisfied, node E is returned to requesting component 1012. To "return node E" is to return information associated with the UI element that node E represents; information such as links 320A, properties 320B, patterns 320C, and events 320D.

Following the format above, Table 9 provides illustrative steps consistent with the API of Table 6 to provide to a requesting component with information related to the piece of UI represented by node E's next sibling subject to a condition according to an embodiment of the present invention. Table 9 should be read with reference to FIG. 14.

TABLE 9

Determination of Node E's conditional next sibling (See FIG. 14)

| Action | Result |
| --- | --- |
| GetViewNextSibling( E ): | NextSibling( E ) is F, call TryAsFirstOrNext( F ) |
| TryAsFirstOrNext( F ): | Condition( F ) fails. FirstChild( F ) is NULL. Call TryContinuedNext( F ) |
| TryContinuedNext( F ): | NextSibling( F ) is G, call TryAsFirstOrNext( G ) |
| TryAsFirstOrNext( G ): | Condition( G ) fails. FirstChild( G ) is NULL. Call TryContinuedNext( G ) |
| TryContinuedNext( G ): | NextSibling( G ) is NULL. Parent( G ) is B, Condition( B ) fails, call TryContinuedNext( B ) |
| TryContinuedNext( B ): | NextSibling( B ) is H, call TryAsFirstOrNext( H ) |
| TryAsFirstOrNext( H ): | Condition( H ) fails. FirstChild( H ) is I, call TryAsFirstOrNext( I ) |
| TryAsFirstOrNext( I ): | Condition( I ) fails. FirstChild( I ) is NULL. Call TryContinuedNext( I ) |
| TryContinuedNext( I ): | NextSibling( I ) is J, call TryAsFirstOrNext( J ) |
| TryAsFirstOrNext( J ): | Condition( J ) succeeds, RETURN J. |

Following the format above, Table 10 provides illustrative steps consistent with the API of Table 6 to provide to a requesting component with information related to the piece of UI represented by node J's next sibling subject to a condition according to an embodiment of the present invention. Table 10 should be read with reference to FIG. 14.

TABLE 10

Determination of Node J's conditional next sibling (See FIG. 14)

| Action | Result |
| --- | --- |
| GetViewNextSibling( J ): | NextSibling( J ) is L, call TryAsFirstOrNext( L ). |
| TryAsFirstOrNext( L ): | Condition fails. FirstChild( L ) is NULL. Call TryContinuedNext( L ). |
| TryContinuedNext( L ): | NextSibling( L ) is NULL. Parent( L ) is H, Condition fails, call TryContinuedNext( H ). |
| TryContinuedNext( H ): | NextSibling( H ) is NULL. Parent( H ) is A, Condition( A ) succeeds, RETURN NULL |

A final illustration is provided with respect to Table 11, which provides illustrative steps consistent with the API of Table 6 to provide to a requesting component with information related to the piece of UI represented by node J's first child subject to a condition according to an embodiment of the present invention. Table 11 should be read with reference to FIG. 14.

TABLE 11

Determination of Node J's conditional first child (See FIG. 14)

| Action | Result |
| --- | --- |
| GetViewFirstChild( J ): | FirstChild( J ) is K, call TryAsFirstOrNext( K ). |
| TryAsFirstOrNext( K ): | Condition fails. FirstChild( K ) is NULL. Call TryContinuedNext( K ). |
| TryContinuedNext( K ): | NextSibling( K ) is NULL. Parent( K ) is J, Condition( J ) succeeds, return NULL. |

Employing Prefetching

The process that contains the target UI may be entered into to enable capturing of node structure and information, serializing of the results, returning them to requesting component 1012, and then reconstruction of the structure based on the captured information on the client side. The caller can then work against this reconstructed captured snapshot instead of having to make expensive cross-process calls to visit the UI elements in the other processes.

The present invention traverses a raw tree using a depth-first traversal, serializing as it does so, and omits information about any nodes that do not satisfy the condition(s) 1032. The serialized data returned includes a table of properties, with as many rows as elements that matched the condition, and as many columns as properties that were requested; and a string that indicates the structure of the filtered tree.

The structure of the is produced by preferably performing a depth-first traversal of the tree, and adding a first marker when arriving at a node, and adding a different marker when leaving a node (after having visited all the node's children in this embodiment). Although any character or string may be used, an open parentheses '(' is used herein as an exemplary entry marker, and a closed parentheses ')' is used to denote an exemplary the exit marker. For example, a tree with one root node containing two child nodes could be represented as: "(( )( ))".

This is somewhat akin to the representation of tree structures used by the programming languages Lisp and Scheme. The lack of recording markers for nodes that do not satisfy the condition is enough to remove them from the tree that the client sees.

Pseudo-code that illustrates such a traversal is depicted below in Table 12.

TABLE 12

Exemplary pseudocode generating custom views using prefetching

```
// Structure and properties are 'in/out' objects that are passed
by reference
// so they can be appended to.
CollectSubtree( Node root, string structure, table properties )
{
    // If this node is in the view, add an entry marker, and add
    a row to the
    // table containing its properties
    bool satisfiedCondition = false;
    if( SatisfiesCondition( root ) )
    {
        satisfiedCondition = true;
        structure.Append('(');
        table.AppendRow( GetProperties( root ) );
    }
    // Recursively process children
    for( Node child = FirstChild( root ) ; child != NULL ; child =
    NextSibling(
    child ) )
    {
        CollectSubtree( child, structure, properties );
    }
    // Add an exit marker, but only if we added an entry marker...
    if(satisfiedCondition )
    {
        Structure.Append(')' );
    }
}
```

Exemplary pseudocode for parsing the string is depicted below in Table 13.

TABLE 13

Exemplary pseudocode for parsing a string generated by the pseudocode of Table 12

```
// Initial call should use index = 0
// This version assumes a well-formatted string
Node ParseString( String str, int index )
{
    if( str.Length >= index || str[ index ] != '(' )
        return NULL;
    index = index + 1;
    Node = new Node( );
    while(true)
    {
        Node child = ParseString( str, index );
        if( child == NULL )
            break;
        node.AddChild( child );
    }
    index++; // Skip over closing ')'.
    return node;
}
```

In a preferred embodiment, the present invention also checks for errors in the string, and, for each node constructed, attaches information from the next successive row in the table of properties from the matching elements. An exemplary run is depicted in Table 14 below, with reference to FIG. 14.

TABLE 14

Illustrative example of employing the pseudocode of in Table 12 on the tree of FIG. 14

| Visited | Appended to string |
|---|---|
| Enter A | Add '(' |
| Enter B | |
| Enter C | |
| Enter D | |
| Leave D | |

TABLE 14-continued

Illustrative example of employing the pseudocode of in Table 12 on the tree of FIG. 14

| | |
|---|---|
| Enter E | Add '(' |
| Leave E | Add ')' |
| Enter F | |
| Leave F | |
| Enter G | |
| Leave G | |
| Leave B | |
| Enter H | |
| Enter I | |
| Leave I | |
| Enter J | Add '(' |
| Enter K | |
| Leave K | |
| Leave J | Add ')' |
| Enter L | |
| Leave L | |
| Leave H | |
| Leave A Add ')' | |

When run against the tree 1410, it is traversed depth-first, resulting in the node being visited and the string is build up as follows shown. This results in the string "(( )( ))", which, when deserialized by the caller, results in subtree 1412—consisting of a root containing two nodes, each of which contains no children—which is the desired filtered view.

As can be seen, the present invention and its equivalents are well-adapted to providing an improved method and system for representing multiple hierarchal structures as a single hierarchal structure, custom views of the same, and evaluating conditions against the structures to help navigate trees and more. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described. Not all steps of the aforementioned flow diagrams are necessary steps.

The invention claimed is:

1. One or more computer-storage media having computer-executable instructions embodied thereon for performing a method for providing a custom logical view of a set of user-interface elements (UI elements), the media comprising:

analyzing the set of UI elements so as to construct a raw tree structure having a plurality of nodes, the nodes corresponding to respective UI elements of the set, the raw tree structure including a plurality of logical trees that are aggregated to appear as a single tree by providing a set of referential links between a first node of a first logical tree of the plurality of logical trees and a second node of a second logical tree of the plurality of logical trees;

identifying a subset of the nodes that satisfy one or more conditions that were received from a requesting component and that are associated with the function of the UI elements; and communicating to a requesting component a custom representation of the raw tree structure that includes the subset of the nodes.

2. The media of claim 1, wherein said UI elements include viewable components of a user interface (UI).

3. The media of claim 2, wherein said viewable components include: a button; a button component, including a button image or button text; a menu; a menu item; a textbox; a drop-down menu; a list box; a radio button; a scroll bar; a link, including a hyperlink; an icon, or a highlightable component.

4. The media of claim 2, wherein said one or more conditions relate to a desired attribute of said UI element(s).

5. The media of claim 4, wherein said desired attribute is a link; a property; a pattern; or an event.

6. The media of claim 5, wherein said custom representation of the raw tree structure includes a new UI element utilizing an assimilation of data related to said identified nodes.

7. The media of claim 6, said requesting component comprises:
a client application;
a process;
a segment of computer-useable code; or
an end user.

8. An application interface (API) embodied on one or more computer-storage media for processing calls from a requesting component to navigate a tree structure composed of nodes that represent a plurality of user-interface elements (UI elements), the API comprising computer-readable program components for:
receiving from the requesting component a request to navigate the tree structure to a target UI element, the request including at least one condition associated with the function of the target UI element to be met, and the tree structure including a plurality of logical trees that are aggregated to appear as a single tree by providing a set of referential links between a first node of a first logical tree of the plurality of logical trees and a second node of a second logical tree of the plurality of logical trees;
providing for the application of the at least one condition to all or a portion of the nodes, whereby the target UI element is identified based on the condition or conditions that are applied; and
returning to the requesting component attribute information associated with the identified UI element.

9. The API of claim 8, wherein said at least one condition includes criteria to be possessed by said target UI element.

10. The API of claim 9, wherein said target UI element comprises:
a button; a button component, including a button image or button text; a menu; a menu item; a textbox; a drop-down menu; a list box; a radio button; a scroll bar; a link, including a hyperlink; an icon, or a highlightable component.

11. The API of claim 10, wherein said requesting component comprises:
a client application;
a process;
a segment of computer-useable code; or
an end user.

12. The API of claim 10, wherein the application of at said at least one condition, includes:
iteratively visiting said all or a portion of the nodes and determining whether said nodes satisfy the at least one condition.

13. The API of claim 12, wherein said attribute information includes information related to physical characteristics of said UI elements.

14. The API of claim 13, wherein said physical UI characteristics include one or more of the following:
an identification of a single node;
a hierarchal representation of a set of nodes;
an indication as to whether the UI element is focusable;
an indication as to whether the UI element has the focus;
an indication as to whether the UI element is selectable;
an indication as to whether the UI element is resizeable;
an indication as to whether the UI element is manipulatable;
an indication as to whether the UI element is viewable;
an indication as to the screen location of said UI element; and/or
an indication of the relationship said UI element is to another UI element.

15. Employing the API of claim 8 to provide a custom view of a set of UI elements.

16. Employing the API of claim 8 to provide navigation information.

17. Employing the API of claim 8 to navigate a raw tree structure.

18. One or more computer-storage media having computer-executable instructions embodied thereon for performing a method of representing to a requesting component a portion of user-interface elements (UI elements) of a target component, the UI elements having one or more attributes, the method comprising:
receiving from the requesting component at least one condition that indicates UI-element attributes of interest;
providing a logical tree composed of a plurality of nodes that represent a corresponding plurality of UI elements, the logical tree including a plurality of sub-trees that are aggregated to appear as a single tree by providing a set of referential links between a first node of a first sub-tree of the plurality of sub-trees and a second node of a second sub-tree of the plurality of sub-trees;
using the provided logical tree, identifying one or more UI elements that satisfy the at least one condition to generate a customized version of the logical tree that includes only the one or more UI elements that satisfy the at least one condition; and
conveying the customized version of the logical tree to the requesting component to provide the element information associated with the identified one or more UI elements, wherein the first and second nodes appear to the requesting component as a single node in the customized version of the logical tree.

19. The media of claim 18, wherein representing said portion of said UI elements includes providing element information about said UI elements to said requesting component.

20. The media of claim 19, wherein said element information includes:
an identification of a single node;
a hierarchal representation of a set of nodes;
an indication as to whether the UI element is focusable;
an indication as to whether the UI element has the focus;
an indication as to whether the UI element is selectable;
an indication as to whether the UI element is resizeable;

an indication as to whether the UI element is manipulatable;

an indication as to whether the UI element is viewable;

an indication as to the screen location of said UI element; and/or an indication of the relationship said UI element is to another UI element.

21. The media of claim 20, wherein said target component includes aspects of an operating system.

22. The media of claim 20, wherein said target component includes one or more UI subcomponents.

23. Employing the media of claim 18 to navigate to UI elements of said target component.

24. A system for providing information related to elements of a user interface (UI elements), the system comprising one or more computing devices having a processor and configured to provide:

a request-receiving component for receiving, at an interface component, instructions, the instructions including, (1) one or more conditions that indicate attributes of interest that may be possessed by UI elements of the user interface, and (2) a request for information related to the UI elements that satisfy the one or more conditions;

an intermediary-interpreter component configured to merge properties and patterns associated with a first and a second node of a first and a second logical tree respectively, at least one of the properties and patterns of the first node being provided by a different provider than at least one property or pattern of the second node;

a consolidator component configured to represent the first and second nodes as a single entity in a consolidated logical tree that is comprised of the first and second logical trees; and a transmission component configured to transmit a customized logical tree that includes the information associated with one or more UI elements that satisfy the one or more conditions, the customized logical tree being a customized version of the consolidated logical tree that includes only nodes that provide the information associated with the one or more UI elements that satisfy the one or more conditions.

25. One or more computer-storage media having-computer-executable instructions embodied thereon for performing a method for representing elements of a user interface (UI elements), the method comprising:

a) providing a representation of the UI elements as a raw tree structure having a plurality of virtual nodes and virtual branches, the nodes corresponding to the UI elements, the branches corresponding to relationships between UI elements;

b) providing for the reception of a condition associated with the function of the UI elements to be satisfied by UI elements of interest;

c) providing for the reception of an indication of a target set of nodes to evaluate;

d) providing for the evaluation of said condition against said nodes, and if said node represents a UI element that satisfies said condition, then providing a marker to represent said node, but if said node represents a UI element that does not satisfy said condition, then not providing said marker; said marker including a character or string of alphanumeric symbols;

e) repeating step d until said target set of nodes has been evaluated; and f) communicating said string to a requesting component that, incident to receiving said string, can use said string to construct a filtered view of said raw tree consisting of an identified starting node and only nodes that satisfy said condition, wherein at least one of the nodes that satisfy said condition comprise a plurality of nodes that are consolidated to appears as a single node.

* * * * *